US012635027B2

(12) United States Patent (10) Patent No.: US 12,635,027 B2
Yu et al. (45) Date of Patent: May 19, 2026

(54) COMMUNICATION METHOD AND APPARATUS

(71) Applicant: HUAWEI TECHNOLOGIES CO., LTD., Shenzhen (CN)

(72) Inventors: Haifeng Yu, Beijing (CN); Bingzhao Li, Beijing (CN); Zhenzhen Cao, Boulogne Billancourt (FR); Lei Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 349 days.

(21) Appl. No.: 18/314,209

(22) Filed: May 9, 2023

(65) Prior Publication Data

US 2023/0319942 A1 Oct. 5, 2023

Related U.S. Application Data

(63) Continuation of application No. PCT/CN2020/128349, filed on Nov. 12, 2020.

(51) Int. Cl.
*H04W 76/20* (2018.01)
*H04W 72/23* (2023.01)

(52) U.S. Cl.
CPC ........... *H04W 76/20* (2018.02); *H04W 72/23* (2023.01)

(58) Field of Classification Search
CPC ......... H04W 4/06; H04W 4/50; H04W 72/23; H04W 76/20; Y02D 30/70
See application file for complete search history.

(56) References Cited

U.S. PATENT DOCUMENTS 8,660,052 B2 * 2/2014 Liang ................... H04W 72/30
370/254
10,728,710 B2 * 7/2020 Siddiqui ................. H04W 4/06
(Continued)

FOREIGN PATENT DOCUMENTS

CN 101742406 A * 6/2010
CN 102413431 A * 4/2012
(Continued)

OTHER PUBLICATIONS

Huawei et al., Discussion on multicast support for Idle/Inactive UEs, Aug. 17, 2020, 3GPP TSG RAN WG1 Meeting #102-e, E-meeting, Agenda Item: 8.12.3, Tdoc: R1-2005272 (Year: 2020).*
(Continued)

*Primary Examiner* — Eric Nowlin
(74) *Attorney, Agent, or Firm* — HAUPTMAN HAM, LLP

(57) ABSTRACT

A communication method includes obtaining, by a terminal device or a chip in the terminal device, configuration information of a multicast service. The configuration information is useable by the terminal device to receive data of the multicast service. The method further includes receiving first indication information from an access network device. The first indication information is useable to indicate a manner of obtaining configuration update information of the multicast service by the terminal device. The manner of obtaining the configuration update information of the multicast service is a first manner or a second manner. The first manner is obtaining the configuration update information by receiving a common message. The second manner is obtaining the configuration update information by receiving a dedicated message.

9 Claims, 8 Drawing Sheets

(56) References Cited

U.S. PATENT DOCUMENTS

| | | | | | |
|---|---|---|---|---|---|
| 11,653,384 | B2 * | 5/2023 | Saggar | H04W 74/006 | 370/329 |
| 12,495,282 | B2 * | 12/2025 | Yu | H04W 4/50 | |
| 2012/0039237 | A1 * | 2/2012 | Liang | H04W 72/30 | 370/312 |
| 2012/0320874 | A1 * | 12/2012 | Li | H04B 7/06952 | 370/328 |
| 2014/0313978 | A1 * | 10/2014 | Tajima | H04W 52/0216 | 370/328 |
| 2016/0029358 | A1 * | 1/2016 | Hou | H04B 7/0695 | 370/329 |
| 2016/0157267 | A1 * | 6/2016 | Frenne | H04B 7/0617 | 370/329 |
| 2018/0176888 | A1 * | 6/2018 | Siddiqui | H04W 4/06 | |
| 2018/0199267 | A1 | 7/2018 | Lin et al. | | |
| 2020/0329347 | A1 * | 10/2020 | Prasad | H04W 88/16 | |
| 2022/0046726 | A1 * | 2/2022 | Taherzadeh Boroujeni | H04W 16/28 | |
| 2023/0247401 | A1 * | 8/2023 | Yu | H04W 72/54 | 455/414.1 |
| 2023/0319942 | A1 * | 10/2023 | Yu | H04W 4/06 | 370/329 |
| 2023/0397299 | A1 * | 12/2023 | Dai | H04W 4/08 | |
| 2024/0023142 | A1 * | 1/2024 | Zhang | H04W 4/50 | |
| 2024/0137732 | A1 * | 4/2024 | Qi | H04W 72/231 | |
| 2024/0236621 | A9 * | 7/2024 | Qi | H04W 4/06 | |
| 2025/0261273 | A1 * | 8/2025 | Mo | H04W 76/28 | |

FOREIGN PATENT DOCUMENTS

| | | | | | |
|---|---|---|---|---|---|
| CN | 101873532 | B | * | 1/2013 | H04W 72/30 |
| CN | 102413431 | B | * | 6/2014 | |
| CN | 113141580 | B | * | 5/2022 | H04W 4/20 |
| CN | 116250308 | A | * | 6/2023 | H04W 72/23 |
| CN | 116349256 | A | * | 6/2023 | H04W 76/40 |
| CN | 117223325 | A | * | 12/2023 | |
| CN | 117641252 | A | * | 3/2024 | H04W 76/27 |
| CN | 117793624 | A | * | 3/2024 | H04W 4/021 |
| CN | 113853824 | B | * | 4/2024 | H04W 72/50 |
| CN | 118042649 | A | * | 5/2024 | H04W 68/005 |
| CN | 118317438 | A | * | 7/2024 | H04W 72/50 |
| CN | 118870521 | A | * | 10/2024 | H04L 5/0053 |
| CN | 116250308 | B | * | 9/2025 | H04W 68/005 |
| EP | 2424318 | A1 | * | 2/2012 | H04W 72/30 |
| EP | 2667643 | A1 | * | 11/2013 | H04W 36/0007 |
| EP | 4210422 | A1 | * | 7/2023 | H04W 72/23 |
| EP | 4231670 | A1 | * | 8/2023 | H04W 4/06 |
| EP | 4615151 | A1 | * | 9/2025 | H04W 68/005 |
| KR | 20230107547 | A | * | 7/2023 | H04W 4/06 |
| WO | 2018035816 | A1 | | 3/2018 | |
| WO | 2018165955 | A1 | | 9/2018 | |
| WO | WO-2022073246 | A1 | * | 4/2022 | H04W 72/23 |
| WO | WO-2022082588 | A1 | * | 4/2022 | H04W 76/40 |
| WO | WO-2022099539 | A1 | * | 5/2022 | H04W 4/06 |
| WO | WO-2022237552 | A1 | * | 11/2022 | H04W 4/06 |
| WO | WO-2023066081 | A1 | * | 4/2023 | H04W 76/15 |
| WO | WO-2023231033 | A1 | * | 12/2023 | H04W 4/06 |
| WO | WO-2024066858 | A1 | * | 4/2024 | H04W 4/021 |
| WO | WO-2024092751 | A1 | * | 5/2024 | H04W 68/02 |
| WO | WO-2024093774 | A1 | * | 5/2024 | H04W 68/005 |

OTHER PUBLICATIONS

Huawei et al., Discussion on multicast support for Idle/Inactive UEs, Oct. 26, 2020, 3GPP TSG RAN WG1 Meeting #103-e, E-meeting, Agenda Item: 8.12.3, Tdoc: R1-2007564 (Year: 2020).*
CATT et al., Discussion on basic functions for broadcast/multicast for RRC_IDLE/RRC_INACTIVE UEs, Oct. 26, 2020, 3GPP TSG RAN WG1 Meeting #103-e, E-meeting, Agenda Item: 8.12.3, Tdoc: R1-2007837 (Year: 2020).*
Moderator (BBC), Summary # 3 on RAN basic functions for broadcast/multicast for UEs in RRC_IDLE/ RRC_INACTIVE states, Oct. 26, 2020, 3GPP TSG RAN WG1 Meeting #103-e, E-meeting, Agenda Item: 8.12.3, Tdoc: R1-2009554 (Year: 2020).*
3GPP TS 38.321 V16.2.1 (Sep. 2020), 3rd Generation Partnership Project; Technical Specification Group Radio Access Network; NR; Medium Access Control (MAC) protocol specification (Release 16), total 151 pages.
3GPP TS 38.331 V16.2.0 (Sep. 2020), 3rd Generation Partnership Project; Technical Specification Group Radio Access Network; NR; Radio Resource Control (RRC) protocol specification (Release 16), total 926 pages.
3GPP TS 36.331 V16.2.1 (Sep. 2020), 3rd Generation Partnership Project; Technical Specification Group Radio Access Network; Evolved Universal Terrestrial Radio Access (E-UTRA); Radio Resource Control (RRC); Protocol specification (Release 16), total 1064 pages.
NR Multicast-Broadcast services and configuration for UEs in different RRC states , 3GPP Draft; R2-2009038, Oct. 23, 2020, total 7 pages.
India Office Action issued in corresponding India Application No. 202327032248, dated Jul. 1, 2024, pp. 1-6.

* cited by examiner

COMMUNICATION METHOD AND APPARATUS

CROSS-REFERENCE TO RELATED APPLICATIONS

This application is a continuation of International Application No. PCT/CN2020/128349, filed on Nov. 12, 2020, the disclosure of which is hereby incorporated by reference in its entirety.

TECHNICAL FIELD

This application relates to the field of wireless communication technologies, and in particular, to a communication method and apparatus.

BACKGROUND

In a wireless communication system, a multicast transmission technology is a transmission technology in which one sender sends data and a plurality of receivers receive the data. For example, an access network device sends data, and a plurality of terminal devices receive the data. A possible multicast transmission technology is a single cell point to multipoint (single cell point to multipoint, SC-PTM) technology.

When transmitting data of a multicast service by using the multicast transmission technology (for example, the SC-PTM technology), the terminal device first obtains configuration information of the multicast service, and then receives the data of the multicast service based on the configuration information of the multicast service. During specific implementation, the configuration information of the multicast service may be updated. Therefore, how the terminal device obtains configuration update information of the multicast service still needs further research.

SUMMARY

One or more embodiments of this application provide a communication method and apparatus, to avoid unnecessary receiving behavior performed by a terminal device in connected mode when the terminal device obtains configuration update information of a multicast service, and reduce power consumption.

According to a first aspect, an embodiment of this application provides a communication method. The method is applicable to a terminal device or a chip in the terminal device. For example, the method is applicable to the terminal device. In the method, the terminal device obtains configuration information of a multicast service, where the configuration information is used by the terminal device to receive data of the multicast service; and receives first indication information from an access network device, where the first indication information indicates a manner of obtaining configuration update information of the multicast service by the terminal device, where the manner of obtaining the configuration update information of the multicast service by the terminal device is a first manner or a second manner, where the first manner is obtaining the configuration update information by receiving a common message, and the second manner is obtaining the configuration update information by receiving a dedicated message.

In some embodiments, the terminal device in connected mode may determine, based on the first indication information sent by the access network device, which of the first manner and the second manner is used to obtain the configuration update information of the multicast service, to avoid using both the first manner and the second manner to obtain repeated configuration update information, so that unnecessary receiving behavior can be effectively avoided, and power consumption of the terminal device can be reduced.

In some embodiments, obtaining the configuration information of the multicast service includes: receiving a first radio resource control RRC message from the access network device, where the first RRC message includes the configuration information of the multicast service: or receiving a common message from the access network device, where the common message includes the configuration information of the multicast service.

In some embodiments, the first indication information is carried in a second RRC message, a MAC CE, or DCI.

In some embodiments, the first indication information includes an index of the manner of obtaining the configuration update information of the multicast service by the terminal device.

In some embodiments, before the first indication information is received from the access network device, the method further includes: receiving a third RRC message from the access network device, where the third RRC message includes an index of the first manner and an index of the second manner.

In some embodiments, the method further includes: receiving second indication information from the access network device, where the second indication information indicates effective time of the first indication information.

In some embodiments, all of different terminal devices may start, at the effective time of the first indication information, to obtain the configuration update information of the multicast service in the manner indicated by the first indication information, to ensure that a terminal device side and an access network device side have consistent understanding of the manner of obtaining the configuration update information of the multicast service.

According to a second aspect, an embodiment of this application provides a communication method. The method is applicable to an access network device or a chip in the access network device. For example, the method is applicable to the access network device. In the method, the access network device sends configuration information of a multicast service, where the configuration information is used by a terminal device to receive data of the multicast service; and sends first indication information to the terminal device, where the first indication information indicates a manner of obtaining configuration update information of the multicast service by the terminal device, where the manner of obtaining the configuration update information of the multicast service by the terminal device is a first manner or a second manner, where the first manner is obtaining the configuration update information by receiving a common message, and the second manner is obtaining the configuration update information by receiving a dedicated message.

In some embodiments, sending the configuration information of the multicast service includes: sending a first RRC message to the terminal device, where the first RRC message includes the configuration information of the multicast service: or sending a common message, where the common message includes the configuration information of the multicast service.

In some embodiments, the first indication information is carried in a second RRC message, a MAC CE, or DCI.

In some embodiments, the first indication information includes an index of the manner of obtaining the configuration update information of the multicast service by the terminal device.

In some embodiments, before the first indication information is sent to the terminal device, the method further includes: sending a third RRC message to the terminal device, where the third RRC message includes an index of the first manner and an index of the second manner.

In some embodiments, the method further includes: sending second indication information to the terminal device, where the second indication information indicates effective time of the first indication information.

It should be noted that the method described in the second aspect corresponds to the method described in the first aspect. For beneficial effects of related technical features in the method described in the second aspect, refer to the descriptions in the first aspect. Details are not described again.

According to a third aspect, an embodiment of this application provides a communication method. The method is applicable to a terminal device or a chip in the terminal device. For example, the method is applicable to the terminal device. In the method, the terminal device obtains configuration information of a multicast service, where the configuration information is used by the terminal device to receive data of the multicast service; and determines, based on a radio resource control RRC mode of the terminal device, a manner of obtaining configuration update information of the multicast service by the terminal device, where the manner of obtaining the configuration update information of the multicast service by the terminal device is a first manner or a second manner, where the first manner is obtaining the configuration update information by receiving a common message, and the second manner is obtaining the configuration update information by receiving a dedicated message.

In some embodiments, the terminal device in connected mode may determine, based on the RRC mode, which of the first manner and the second manner is used to obtain the configuration update information of the multicast service, to avoid using both the first manner and the second manner to obtain repeated configuration update information, so that unnecessary receiving behavior can be effectively avoided, and power consumption of the terminal device can be reduced.

In some embodiments, determining, based on the RRC mode of the terminal device, the manner of obtaining the configuration update information of the multicast service by the terminal device includes: when the terminal device is in idle mode or inactive mode, determining that the manner of obtaining the configuration update information of the multicast service by the terminal device is the first manner: or when the terminal device is in connected mode, determining that the manner of obtaining the configuration update information of the multicast service by the terminal device is the second manner.

In some embodiments, the method further includes: receiving configuration information of a common message and third indication information from an access network device, where the third indication information indicates that the configuration information of the common message is used by the terminal device in idle mode or inactive mode to receive the common message: the determining that the manner of obtaining the configuration update information of the multicast service by the terminal device is the first manner includes: determining, based on the third indication information, that the manner of obtaining the configuration update information of the multicast service by the terminal device is the first manner; and the determining that the manner of obtaining the configuration update information of the multicast service by the terminal device is the second manner includes: determining, based on the third indication information, that the manner of obtaining the configuration update information of the multicast service by the terminal device is the second manner.

In some embodiments, the method further includes: receiving configuration information of a common message and fourth indication information from an access network device, where the configuration information of the common message includes change notification information of the common message, and the fourth indication information indicates that the change notification information of the common message is used by the terminal device in idle mode or inactive mode to receive a change notification of the common message: the determining that the manner of obtaining the configuration update information of the multicast service by the terminal device is the first manner includes: determining, based on the fourth indication information, that the manner of obtaining the configuration update information of the multicast service by the terminal device is the first manner; and the determining that the manner of obtaining the configuration update information of the multicast service by the terminal device is the second manner includes: determining, based on the fourth indication information, that the manner of obtaining the configuration update information of the multicast service by the terminal device is the second manner.

According to a fourth aspect, an embodiment of this application provides a communication method. The method is applicable to an access network device or a chip in the access network device. For example, the method is applicable to the access network device. In the method, the access network device determines third indication information; and sends configuration information of a common message and the third indication information, where the third indication information indicates that the configuration information of the common message is used by a terminal device in idle mode or inactive mode to receive the common message. Alternatively, in the method, the access network device determines fourth indication information; and sends configuration information of a common message and the fourth indication information, where the configuration information of the common message includes change notification information of the common message, and the fourth indication information indicates that the change notification information of the common message is used by a terminal device in idle mode or inactive mode to receive a change notification of the common message.

According to a fifth aspect, an embodiment of this application provides a communication apparatus. The communication apparatus may be a terminal device or a chip disposed inside the terminal device. The communication apparatus has a function of implementing the first aspect or the third aspect. For example, the communication apparatus includes a corresponding module, unit, or means (means) for performing steps in the first aspect or the third aspect. The function, the unit, or the means may be implemented by using software, may be implemented by using hardware, or may be implemented by hardware executing corresponding software.

In some embodiments, the communication apparatus includes a processing unit and a communication unit. The communication unit may be configured to receive and send a signal, to implement communication between the communication apparatus and another apparatus. For example, the communication unit is configured to receive configuration information from a terminal device. The processing unit may be configured to perform some internal operations of the communication apparatus. Functions performed by the processing unit and the communication unit may correspond to operations in the first aspect or the third aspect.

In some embodiments, the communication apparatus includes a processor, and may further include a transceiver. The transceiver is configured to receive and send a signal, and the processor executes program instructions, to complete the method according to any one of the possible designs or implementations in the first aspect or the third aspect. The communication apparatus may further include one or more memories. The memory is configured to be coupled to the processor, and the memory may store a necessary computer program or instructions for implementing functions in the first aspect or the third aspect. The processor may execute the computer program or the instructions stored in the memory. When the computer program or the instructions are executed, the communication apparatus is enabled to implement the method according to any one of the possible designs or implementations in the first aspect or the third aspect.

In some embodiments, the communication apparatus includes a processor, and the processor may be configured to be coupled to a memory. The memory may store a necessary computer program or instructions for implementing functions in the first aspect or the third aspect. The processor may execute the computer program or the instructions stored in the memory. When the computer program or the instructions are executed, the communication apparatus is enabled to implement the method according to any one of the possible designs or implementations in the first aspect or the third aspect.

In some embodiments, the communication apparatus includes a processor and an interface circuit. The processor is configured to communicate with another apparatus through the interface circuit, and perform the method according to any one of the possible designs or implementations in the first aspect or the third aspect.

According to a sixth aspect, an embodiment of this application provides a communication apparatus. The communication apparatus may be an access network device or a chip disposed inside the access network device. The communication apparatus has a function of implementing the second aspect or the fourth aspect. For example, the communication apparatus includes a corresponding module, unit, or means for performing operations in the second aspect or the fourth aspect. The module, the unit, or the means may be implemented by using software, may be implemented by using hardware, or may be implemented by hardware executing corresponding software.

In some embodiments, the communication apparatus includes a processing unit and a communication unit. The communication unit may be configured to receive and send a signal, to implement communication between the communication apparatus and another apparatus. For example, the communication unit is configured to receive configuration information from a terminal device. The processing unit may be configured to perform some internal operations of the communication apparatus. Functions performed by the processing unit and the communication unit may correspond to operations in the second aspect or the fourth aspect.

In some embodiments, the communication apparatus includes a processor, and the processor may be configured to be coupled to a memory. The memory may store a necessary computer program or instructions for implementing functions in the second aspect or the fourth aspect. The processor may execute the computer program or the instructions stored in the memory. When the computer program or the instructions are executed, the communication apparatus is enabled to implement the method according to any one of the possible designs or implementations in the second aspect or the fourth aspect.

In some embodiments, the communication apparatus includes a processor and an interface circuit. The processor is configured to communicate with another apparatus through the interface circuit, and perform the method according to any one of the possible designs or implementations in the second aspect or the fourth aspect.

It may be understood that, in the fifth aspect or the sixth aspect, the processor may be implemented by using hardware, or may be implemented by using software. When the processor is implemented by using the hardware, the processor may be a logic circuit, an integrated circuit, or the like: or when the processor is implemented by using the software, the processor may be a general-purpose processor, and is implemented by reading software code stored in the memory. In addition, there may be one or more processors, and there may be one or more memories. The memory may be integrated with the processor, or the memory and the processor are disposed separately. In a specific implementation process, the memory and the processor may be integrated into one chip, or may be disposed on different chips. A type of the memory and a manner in which the memory and the processor are disposed are not limited in embodiments of this application.

According to a seventh aspect, an embodiment of this application provides a communication system. The communication system includes the communication apparatus according to the fifth aspect and the communication apparatus according to the sixth aspect.

According to an eighth aspect, this application provides a computer-readable storage medium. The computer storage medium stores computer-readable instructions. When a computer reads and executes the computer-readable instructions, the computer is enabled to perform the method according to any one of the possible designs in any one of the first aspect to the fourth aspect.

According to a ninth aspect, this application provides a computer program product. When a computer reads and executes the computer program product, the computer is enabled to perform the method according to any one of the possible designs in any one of the first aspect to the fourth aspect.

According to a tenth aspect, this application provides a chip. The chip includes a processor. The processor is coupled to a memory, and is configured to read and execute a software program stored in the memory, to implement the method according to any one of the possible designs in any one of the first aspect to the fourth aspect.

These aspects or other aspects of this application are clearer and more comprehensible in descriptions of the following embodiments.

DETAILED DESCRIPTION

Figure 1:
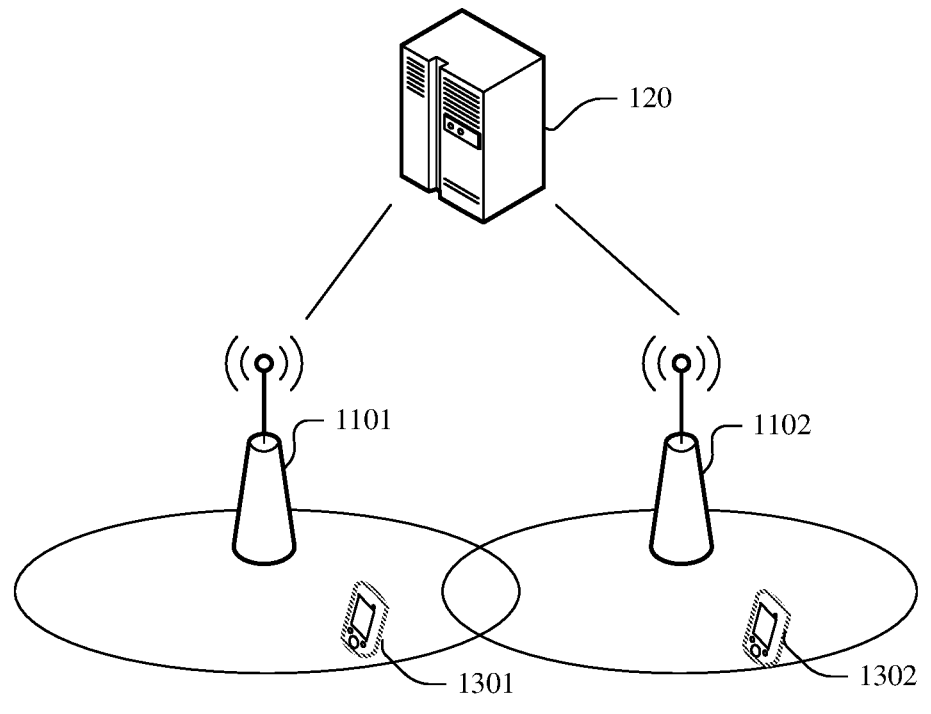
FIG. 1 is a schematic diagram of a network architecture to which an embodiment of this application is applicable.

The following clearly describes the technical solutions in embodiments of this application with reference to the accompanying drawings in embodiments of this application.

First, some terms in embodiments of this application are explained and described, to facilitate understanding of a person skilled in the art.

(1) A terminal device may be a wireless terminal device that can receive scheduling and indication information from an access network device. The wireless terminal device may be a device that provides voice and/or data connectivity for a user, a handheld device with a wireless connection function, or another processing device connected to a wireless modem. The terminal device may communicate with one or more core networks or the Internet through a radio access network (radio access network, RAN). The terminal device may be a mobile terminal device such as a mobile phone (which is also referred to as a "cellular" phone or a mobile phone (mobile phone)), a computer, and a data card. For example, the terminal device may be a portable, pocket-sized, handheld, computer built-in, or in-vehicle mobile apparatus that exchange voice and/or data with the radio access network. For example, the terminal device is a device such as a personal communications service (personal communications service, PCS) phone, a cordless phone, a session initiation protocol (SIP) phone set, a wireless local loop (wireless local loop, WLL) station, a personal digital assistant (personal digital assistant, PDA), a tablet computer (Pad), and a computer with wireless transceiver function. The wireless terminal device may also be referred to as a system, a subscriber unit (subscriber unit), a mobile station (mobile station, MS), a remote station (remote station), an access point (access point, AP), a remote terminal (remote terminal), an access terminal (access terminal), a user terminal (user terminal), a user agent (user agent), a subscriber station (subscriber station, SS), customer premises equipment (customer premises equipment, CPE), a terminal (terminal), user equipment (user equipment, UE), a mobile terminal (mobile terminal, MT), and the like. Alternatively, the terminal device may be a wearable device and a next-generation communication system, for example, a terminal device in a 5G communication system or a terminal device in a future evolved public land mobile network (public land mobile network, PLMN).

(2) An access network device may be a device in a wireless network. For example, the access network device may be a radio access network (radio access network, RAN) node (or device) that enables a terminal device to access the wireless network, and may also be referred to as a base station. Currently, some examples of the RAN devices are a next generation NodeB (generation NodeB, gNodeB), a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station, (for example, home evolved NodeB, or home NodeB, HNB), a base band unit (base band unit, BBU), or a wireless fidelity (wireless fidelity, Wi-Fi) access point (access point, AP) in the 5G communication system. In addition, in a network structure, the access network device may include a central unit (central unit, CU) node, a distributed unit (distributed unit, DU) node, or a RAN device including a CU node and a DU node. In addition, in another possible case, the access network device may be another apparatus that provides a wireless communication function for the terminal device. A specific technology and a specific device form used for the access network device are not limited in embodiments of this application. For ease of description, in embodiments of this application, an apparatus that provides a wireless communication function for the terminal device is referred to as the access network device.

(3) The terms "system" and "network" may be used interchangeably in embodiments of this application. "At least one" means one or more, and "a plurality of" means two or more. The term "and/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. "At least one of the following" or a similar expression thereof means any combination of these items, including a singular item or any combination of a plurality of items. For example, "at least one of A, B, and C" includes A, B, C, AB, AC, BC, or ABC. In addition, unless otherwise specified, ordinal numbers such as "first" and "second" mentioned in embodiments of this application are used to distinguish between a plurality of objects, but are not used to limit a sequence, a time sequence, priorities, or importance of the plurality of objects.

FIG. 1 is a schematic diagram of a network architecture to which an embodiment of this application is applicable. As shown in FIG. 1, a terminal device may access a wireless network, to obtain a service of an external network (for example, the Internet) through the wireless network or communicate with another device, for example, another terminal device, through the wireless network. The wireless network includes a RAN and a core network (core network, CN). The RAN is for enabling the terminal device (for example, a terminal device 1301 or a terminal device 1302) to access the wireless network. The CN is for managing the terminal device and providing a gateway for communicating with the external network.

The RAN may include one or more RAN devices, such as a RAN device 1101 and a RAN device 1102.

The CN may include one or more CN devices, such as a CN device 120. When the network architecture shown in FIG. 1 is applicable to a 5G communication system, the CN device 120 may include an AMF entity, an SMF entity, a UPF entity, and the like.

It should be understood that quantities of devices in the communication system shown in FIG. 1 are merely used as an example. Embodiments of this application are not limited thereto. During actual application, the communication system may further include more terminal devices and more RAN devices, and may further include another device.

Figure 2:
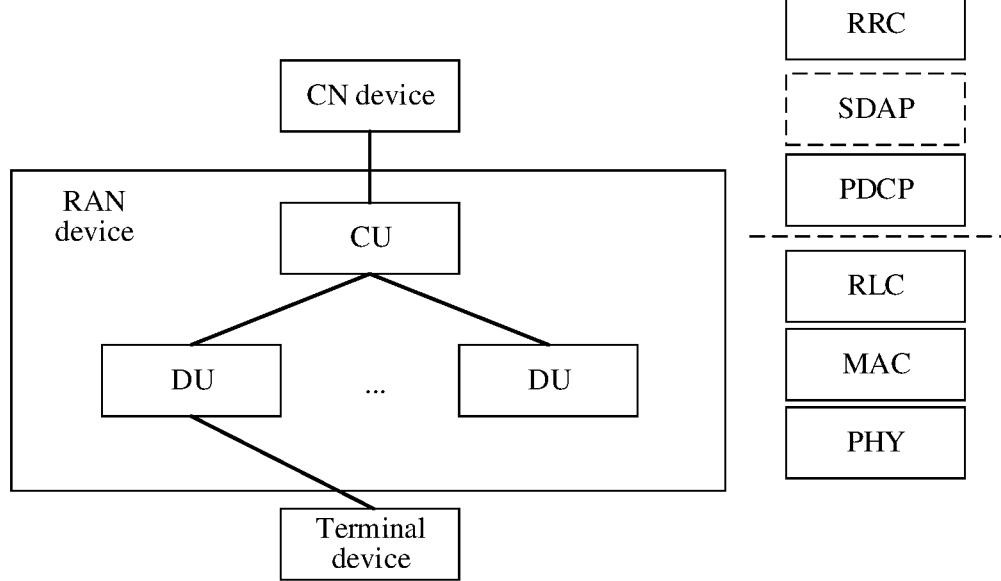
FIG. 2 is a schematic diagram of another network architecture to which an embodiment of this application is applicable.

FIG. 2 is a schematic diagram of another network architecture to which an embodiment of this application is applicable. As shown in FIG. 2, the network architecture includes a CN device, a RAN device, and a terminal device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus. Alternatively, some functions are independently integrated, and some functions are integrated into the baseband apparatus. For example, in an LTE communication system, the RAN device includes the baseband apparatus and the radio frequency apparatus. The radio frequency apparatus may be disposed remotely relative to the baseband apparatus. For example, a remote radio unit (remote radio unit, RRU) is disposed relative to a BBU.

Communication between the RAN device and the terminal device complies with a specific protocol layer structure. For example, a control plane protocol layer structure may include functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. A user plane protocol layer structure may include functions of protocol layers such as a PDCP layer, an RLC layer, a MAC layer, and a physical layer. In a possible implementation, a service data adaptation protocol (service data adaptation protocol, SDAP) layer may be further included above the PDCP layer.

The RAN device may use one node to implement functions of protocol layers such as the RRC layer, the PDCP layer, the RLC layer, and the MAC layer, or may use a plurality of nodes to implement functions of these protocol layers. For example, in an evolved structure, the RAN device may include a CU and DUs, and a plurality of DUs may be controlled by one CU in a centralized manner. As shown in FIG. 2, the CU and the DUs may be obtained through division based on a protocol layer of a wireless network. For example, functions of the PDCP layer and a protocol layer above the PDCP layer are set on the CU, and functions of protocol layers, for example, the RLC layer and the MAC layer, below the PDCP layer are set on the DUs.

Division based on the protocol layer is merely an example, and division may alternatively be performed based on another protocol layer such as the RLC layer. Functions of the RLC layer and a protocol layer above the RLC layer are set on the CU, and functions of protocol layers below the RLC layer are set on the DUs. Alternatively, division is performed at a protocol layer. For example, some functions of the RLC layer and functions of protocol layers above the RLC layer are set on the CU, and a remaining function of the RLC layer and functions of protocol layers below the RLC layer are set on the DUs. In addition, division may alternatively be performed in another manner, for example, based on a delay. A function whose processing time needs to satisfy a delay requirement is set on the DUs, and a function whose processing time does not need to satisfy the delay requirement is set on the CU.

In addition, the radio frequency apparatus may be not placed in the DU but is integrated independently, or may be integrated into the DU, or a part is disposed remotely from the DU and a remaining part is integrated into the DU. This is not limited herein.

Figure 3:
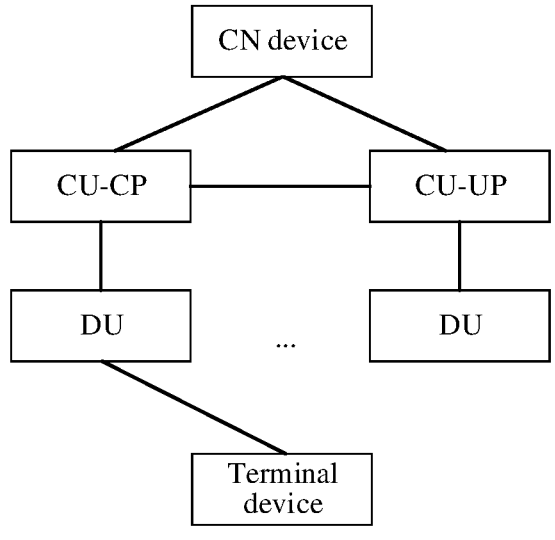
FIG. 3 is a schematic diagram of another network architecture to which an embodiment of this application is applicable.

FIG. 3 is a schematic diagram of another network architecture to which an embodiment of this application is applicable. In comparison with the network architecture shown in FIG. 2, a control plane (CP) and a user plane (UP) of a CU may be further separated in FIG. 3 and implemented as different entities: a control plane (control plane, CP) CU entity (namely, a CU-CP entity) and a user plane (user plane, UP) CU entity (namely, a CU-UP entity).

In the foregoing network architecture, signaling generated by the CU may be sent to a terminal device by using DUs, or signaling generated by a terminal device may be sent to the CU by using DUs. The DUs may transparently transmit the signaling to the terminal device or the CU by directly encapsulating the signaling at a protocol layer without parsing the signaling. In the following embodiments, if such transmission of the signaling between the DUs and the terminal device is involved, sending or receiving of the signaling performed by the DUs includes this scenario. For example, signaling at an RRC layer or a PDCP layer is finally processed as signaling at a PHY layer and sent to the terminal device, or is converted from received signaling at a PHY layer. In this architecture, it may also be considered that the signaling at the RRC layer or the PDCP layer is sent by the DUs or sent by the DUs and a radio frequency apparatus.

The network architecture shown in FIG. 1, FIG. 2, or FIG. 3 is applicable to communication systems of various radio access technologies (radio access technology, RAT). For example, the communication system may be a 4G (which is also referred to as long term (long term evolution, LTE)) communication system, may be a 5G (which is also referred to as new radio (new radio, NR)) communication system, or may be a transition system between the LTE communication system and the 5G communication system. The transition system may also be referred to as a 4.5G communication system. Certainly, the communication system may alternatively be a future communication system. The network architecture and the service scenario described in embodiments of this application are intended to describe the technical solutions in embodiments of this application more clearly, and do not constitute a limitation on the technical solutions provided in embodiments of this application. A person of ordinary skill in the art may know that, with evolution of the communication network architecture and emergence of new service scenarios, the technical solutions provided in embodiments of this application are also applicable to similar technical problems.

An apparatus in the following embodiments of this application may be located in the terminal device or the access network device based on a function implemented by the apparatus. When the foregoing CU-DU structure is used, the access network device may be a CU, a DU, or a RAN device including a CU and a DU.

The following first explains and describes related technical features in embodiments of this application. It should be noted that these explanations are intended to make embodiments of this application easier to be understood, but should not be considered as a limitation on the protection scope claimed in this application.

1. Working Mode of a Terminal Device

The working mode of the terminal device may include a radio resource control (radio resource control, RRC) idle (RRC_IDLE) mode, an RRC inactive (Inactive) mode, and an RRC connected (RRC_CONNECTED) mode. The RRC idle mode may be referred to as an idle mode for short, the RRC inactive mode may be referred to as an inactive mode for short, and the RRC connected mode may be referred to as a connected mode for short. The following separately describes the three working modes.

Idle mode: After the terminal device accesses an access network device through an initial random access process, the access network device may store a device parameter of the terminal device. If the terminal device does not communicate with the access network device for a long time, the access network device deletes the stored device parameter of the terminal device. In this case, the terminal device is in idle mode. When the terminal device is in idle mode, the terminal device has no RRC connection, may perform cell selection and reselection, monitor a paging channel, and perform a tracking area update (tracking area update, TAU). If the terminal device in idle mode needs to communicate with the access network device, the terminal device needs to initiate the random access process again.

Connected mode: After the terminal device accesses an access network device through an initial random access process, the access network device may store a device parameter of the terminal device. During this period, the terminal device may communicate with the access network device. In this case, the terminal device is in connected mode. When the terminal device is in connected mode, the terminal device may receive and send dedicated data, and may save an air interface resource and power of the terminal device through discontinuous reception (discontinuous reception, DRX) based on mobility of the terminal device.

Inactive mode: The terminal device in inactive mode disconnects an RRC connection to an access network device, and does not need to continuously monitor downlink data, so that a power saving effect the same as that in idle mode is achieved. However, both the terminal device in inactive mode and the access network device store context information of the terminal device. When the terminal device needs to enter the connected mode, the access network device may configure, based on the stored context information, the terminal device in inactive mode to enter the connected mode.

2. Multicast Transmission Technology

Figure 4:
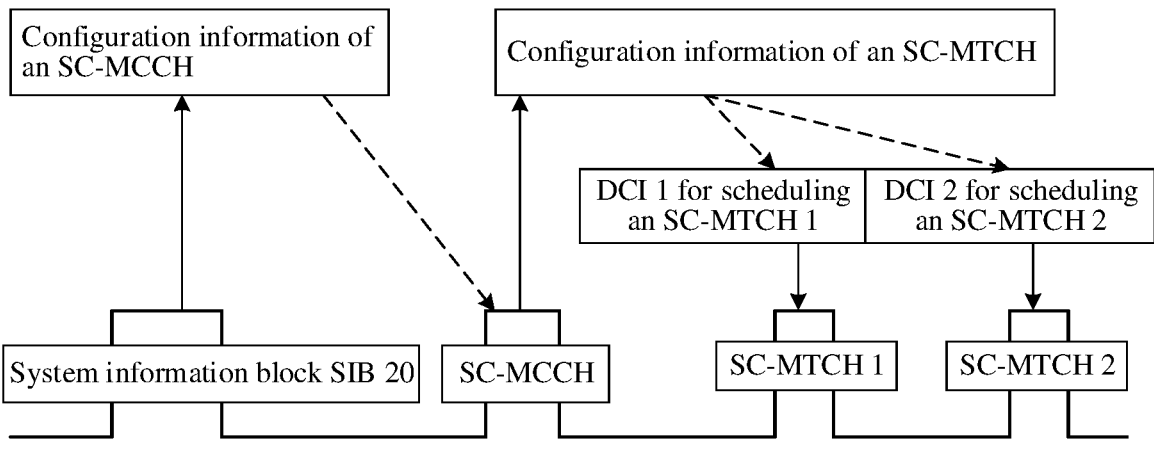
FIG. 4 is a schematic diagram of an SC-MCCH and an SC-MTCH according to an embodiment of this application.

The multicast transmission technology is a transmission technology in which one sender sends data and a plurality of receivers receive the data. A service transmitted by using the multicast transmission technology may be referred to as a multicast service. For example, an access network device sends data of the multicast service, and a plurality of terminal devices receive the data of the multicast service. A possible multicast transmission technology is an SC-PTM technology. Two logical channels are introduced into the SC-PTM technology, and include a single cell MBMS point-to-multipoint control channel (single cell MBMS point-to-multipoint control channel, SC-MCCH) and a single cell multicast transport channel (single cell multicast transport channel, SC-MTCH). The two logical channels are both mapped onto a downlink shared channel (downlink shared channel, DL-SCH). As shown in FIG. 4, the SC-MCCH is for transmitting control information, including an identifier of the multicast service and configuration information of the SC-MTCH (for example, a group radio network temporary identifier (group radio network temporary identifier, G-RNTI) associated with the multicast service and time information of receiving the SC-MTCH). The SC-MTCH is for transmitting the data of the multicast service. Each multicast service may correspond to one SC-MTCH. For example, a multicast service 1 corresponds to an SC-MTCHI, and a multicast service 2 corresponds to an SC-MTCH 2. Further, the terminal may receive the data of the multicast service on the SC-MTCH based on configuration information of the SC-MCCH and corresponding scheduling information.

Specifically, the SC-MTCH in the SC-PTM technology may be mapped onto a physical downlink shared channel (physical downlink shared channel, PDSCH). Different from a PDSCH carrying data of a unicast service, a PDSCH carrying the data of the multicast service may be referred to as a multicast PDSCH. The access network device may preconfigure an association relationship between the multicast service and the G-RNTI, and each multicast service may be associated with one G-RNTI.

For multicast transmission, the access network device may send, to a plurality of terminal devices interested in the multicast service, downlink control information (downlink control information, DCI) carried on a PDCCH, where the DCI is for scheduling the multicast PDSCH carrying the multicast service, and the DCI may be scrambled by using the G-RNTI associated with the multicast service. Accordingly, after detecting the DCI based on the G-RNTI associated with the multicast service, the plurality of terminal devices may receive the multicast PDSCH based on scheduling information included in the DCI.

For unicast transmission, the access network device may send DCI to a terminal device, where the DCI is for scheduling the unicast PDSCH carrying a service (where the service may be the unicast service), and the DCI may be scrambled by using a cell radio network temporary identifier (cell radio network temporary identifier, C-RNTI). Accordingly, after detecting the DCI based on the C-RNTI, the terminal device may receive the unicast PDSCH based on scheduling information included in the DCI.

It can be learned from the foregoing descriptions of the related technical features that, to receive the data of the multicast service, the terminal device needs to first obtain configuration information of the multicast service (where for example, the configuration information of the multicast service may include the G-RNTI associated with the multicast service); and then receive, based on the G-RNTI, the DCI that is sent by the access network device and that is for scheduling the multicast PDSCH, to receive the data of the multicast service. For example, if the configuration information of the multicast service is not updated, the terminal device may always receive the data of the multicast service based on the obtained configuration information of the multicast service. However, during specific implementation, the configuration information of the multicast service may be updated. Therefore, the terminal device needs to obtain configuration update information of the multicast service, update the configuration information of the multicast service based on the configuration update information of the multicast service, and then receive the data of the multicast service based on updated configuration information.

A possible implementation of obtaining the configuration update information of the multicast service by the terminal device is obtaining the configuration update information of the multicast service by receiving a dedicated message. The dedicated message may be a unicast message, may be a multicast message, or may be another possible message dedicated to one terminal device or one group of terminal devices. This is not specifically limited. The unicast message may be a message scheduled by using the DCI that is scrambled by using the C-RNTI (where the message may be carried on the unicast PDSCH), or may be another possible message (for example, an RRC message) dedicated to one terminal device. The multicast message may be a message (where the message may be carried on the multicast PDSCH) scheduled by using DCI that is scrambled by using a multicast RNTI (for example, the G-RNTI), or may be another possible message dedicated to one group of terminal devices (where the group of terminal devices may include one or more terminal devices).

However, the foregoing manner, to be specific, obtaining the configuration update information of the multicast service by receiving the dedicated message, is applicable to the terminal device in connected mode. Currently, for the terminal device in idle mode or inactive mode, there are two possible ideas. One of the two ideas is: The terminal device in idle mode or inactive mode may first enter the connected mode, and then obtain the configuration update information of the multicast service by receiving the dedicated message. In some embodiments, when there are a large quantity of terminal devices in idle mode or inactive mode in a network, each terminal device has an RRC connection to the access network device, and the access network device needs to send the configuration update information of the multicast service to the terminal device. Consequently, signaling overheads are high. The other possible idea is introducing a common message, where the common message may carry the configuration update information of the multicast service, so that the terminal device in idle mode or inactive mode may obtain the configuration update information of the multicast service by receiving the common message. The common message may be a message shared by a plurality of terminal devices. That is, the plurality of terminal devices may all receive the message. For example, the common message may alternatively be understood as a broadcast message. For example, the common message may be carried on a common channel, where the common channel may be a multicast control channel (multicast control channel), may be the SC-MCCH, or may be another possible channel shared by the plurality of terminal devices. This is not specifically limited.

When the manner, to be specific, introducing the common message, is used, because the terminal device in connected mode may also receive the common message, the terminal device in connected mode may obtain the configuration update information of the multicast service by receiving the dedicated message, or may obtain the configuration update information of the multicast service by receiving the common message. In other words, the terminal device in connected mode may obtain repeated configuration update information in the two manners. Consequently, the terminal device in connected mode performs unnecessary receiving behavior when obtaining the configuration update information of the multicast service, and power consumption of the terminal device is high.

Based on this, related implementation of obtaining the configuration update information of the multicast service by the terminal device after the common message is introduced are studied in this application. For example, a communication method provided in embodiments of this application may include two possible solutions: Solution 1 and Solution 2.

In Solution 1, the terminal device may obtain the configuration information of the multicast service, and receive first indication information from the access network device. For example, the first indication information may indicate a manner of obtaining the configuration update information of the multicast service by the terminal device, where the manner indicated by the first indication information may be a first manner or a second manner. The first manner is obtaining the configuration update information of the multicast service by receiving the common message, and the second manner is obtaining the configuration update information of the multicast service by receiving the dedicated message. The terminal device herein may be in connected mode. In some embodiments, the terminal device in connected mode may determine, based on the first indication information sent by the access network device, which of the first manner and the second manner is used to obtain the configuration update information of the multicast service, to avoid using both the first manner and the second manner to obtain the repeated configuration update information, so that the unnecessary receiving behavior can be effectively avoided, and the power consumption of the terminal device can be reduced.

In Solution 2, the terminal device may obtain the configuration information of the multicast service, and determine, based on an RRC mode of the terminal device, a manner of obtaining the configuration update information of the multicast service by the terminal device, where the manner, determined by the terminal device, of obtaining the configuration update information may be a first manner or a second manner. The terminal device herein may be in connected mode, or may be in idle mode or inactive mode. In some embodiments, the terminal device in connected mode may determine, based on the RRC mode, which of the first manner and the second manner is used to obtain the configuration update information of the multicast service, to avoid using both the first manner and the second manner to obtain the repeated configuration update information, so that the unnecessary receiving behavior can be effectively avoided, and the power consumption of the terminal device can be reduced.

The following describes in detail the technical solutions provided in embodiments of this application with reference to Embodiment 1 to Embodiment 4.

In the following description process, an example in which the method is applied to the system architecture shown in FIG. 1 is used. In addition, the method may be performed by two communication apparatuses. The two communication apparatuses are, for example, a first communication apparatus and a second communication apparatus. The first communication apparatus may be the access network device or a communication apparatus that can support the access network device in implementing functions required for the method. Certainly, the first communication apparatus may alternatively be another communication apparatus, for example, a chip or a chip system. The second communication apparatus may be the terminal device or a communication apparatus that can support the terminal device in implementing functions required for the method. Certainly, the second communication apparatus may alternatively be another communication apparatus, for example, a chip or a chip system. For ease of description, the following uses an example in which the method is performed by the access network device and the terminal device, to be specific, an example in which the first communication apparatus is the access network device and the second communication apparatus is the terminal device. If embodiments are applied to the system architecture shown in FIG. 1, the following access network device configured to perform an embodiment shown in FIG. 5, FIG. 7, FIG. 8, or FIG. 9 may be the RAN device 1101 or the RAN device 1102 shown in FIG. 1, and the following terminal device configured to perform the embodiment shown in FIG. 5, FIG. 7, FIG. 8, or FIG. 9 may be the terminal device 1301 or the terminal device 1302 shown in FIG. 1.

Embodiment 1

In Embodiment 1, a possible implementation of the communication method is described based on Solution 1 above. It should be noted that a terminal device in Embodiment 1 may be in connected mode.

Figure 5:
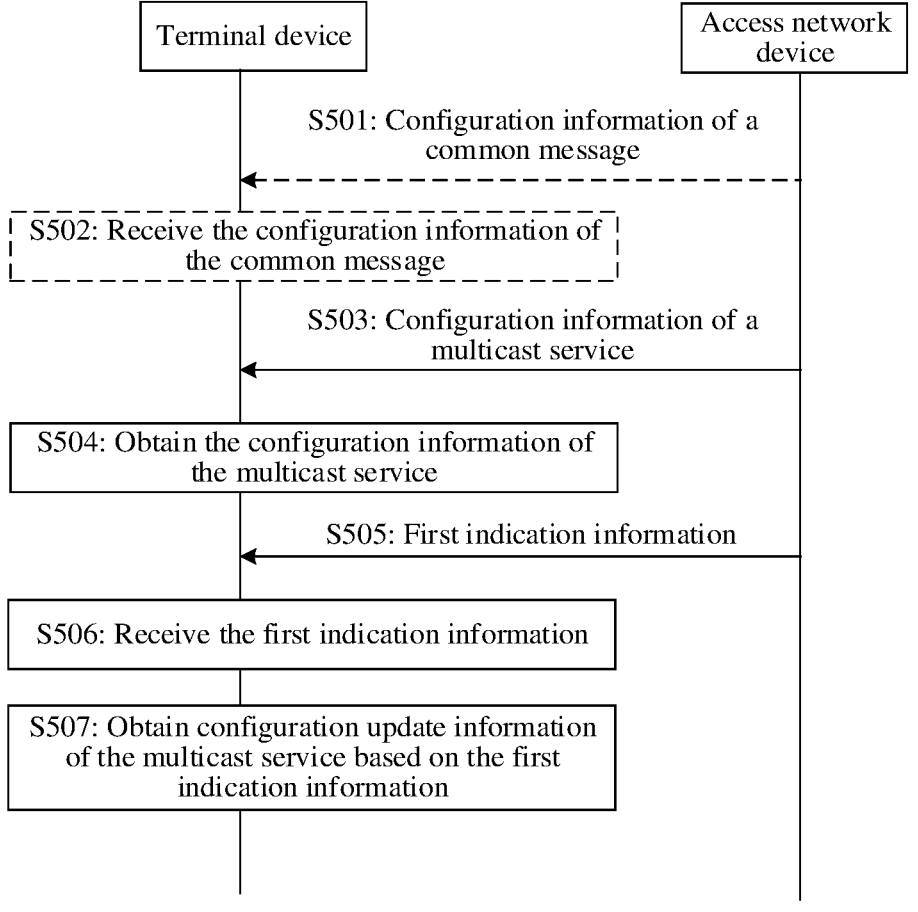
FIG. 5 is a schematic flowchart corresponding to a communication method according to Embodiment 1 of this application.

FIG. 5 is a schematic flowchart corresponding to a communication method according to Embodiment 1 of this application. As shown in FIG. 5, the method may include the following steps.

S501: An access network device sends configuration information of a common message, where the configuration information of the common message may be used by the terminal device to receive the common message.

Accordingly, in S502, the terminal device may receive the configuration information of the common message from the access network device.

Herein, the access network device may broadcast the configuration information of the common message by using a system message (for example, a system information block (system information block, SIB) 20). Accordingly, the terminal device may obtain the configuration information of the common message by receiving the system message. As described above, the common message may be carried on a common channel. Therefore, the configuration information of the common message may alternatively be understood as configuration information of the common channel.

In consideration of a case in which content included in the common message may be updated (or changed), the configuration information of the common message is used by the terminal device to receive the common message. It may alternatively be understood as that the configuration information of the common message is used by the terminal device to receive the common message that is not updated and an updated common message. For example, the common message that is not updated carries configuration information of a multicast service, and the updated common message carries configuration update information of the multicast service.

For example, the configuration information of the common message may include time domain position configuration information and frequency domain position configuration information of the common message, and may further include change notification information of the common message in some embodiments.

(1) The time domain position configuration information of the common message may include at least one of the following: a repetition period (repetition period, RP) of the common message, an offset, a transmission period of the common message, a transmission start position of the common message, or a modification period (modification period, MP) of the common message. The repetition period (repetition period, RP) of the common message and the offset are for determining a period appearing boundary. The common message appears on each system frame that satisfies System frame number (system frame number, SFN) mod Repetition period=Offset, and mod indicates a modulo operation. For example, if the repetition period of the common message is 16 (namely, 16 system frames) and the offset is 1 (namely, an offset of one system frame), system frame numbers of system frames on which the common message appears are 1, 17, 33, 49 . . . . The transmission period of the common message indicates duration of transmission of the common message. For example, the transmission period of the common message is 3 (where that is, the transmission lasts for three subframes). If the transmission start position of the common message is 4, (where that is, the transmission start position is the fourth subframe in a system frame), subframes on which the common message appears are the fourth to the sixth subframes in the system frame.

(2) The frequency domain position configuration information of the common message may include at least one of the following: BWP configuration information, (for example, a BWP in which a frequency domain resource occupied by the common message is located), a frequency domain start position (for example, a physical resource block (physical resource block, PRB) in which the frequency domain resource occupied by the common message is located), a subcarrier spacing, and the like.

(3) The change notification information of the common message may be used by the terminal device to receive a change notification of the common message. For example, if the change notification is carried in DCI, the change notification information may include a scrambling code (for example, a single cell notification radio network temporary identifier (single cell notification RNTI, SC-N-RNTI) or another possible RNTI) for scrambling the DCI. When the configuration information of the common message includes no change notification information, a scrambling code for scrambling DCI may be an SC-N-RNTI by default.

The modification period, the repetition period, and the change notification of the common message are described in detail below with reference to FIG. 6a.

Figure 6A:
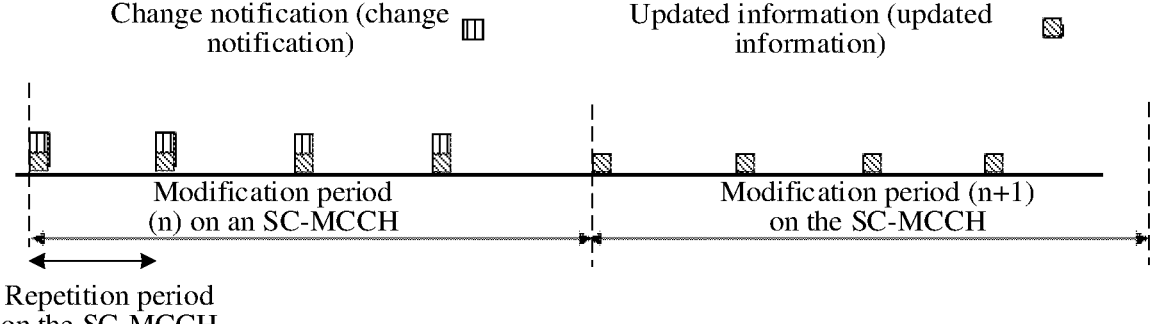
FIG. 6*a* is a schematic diagram of a repetition period and a modification period on an SC-MCCH according to an embodiment of this application.

As shown in FIG. 6a, content of the common message sent by the access network device in a repetition period in a modification period is the same. If the content of the common message needs to be updated, the access network device may start to send the updated common message from a boundary of the modification period. The access network device may further send a change notification of the common message from the boundary of the modification period, where the change notification is carried in DCI scrambled by using an SC-N-RNTI. After receiving the change notification of the common message, the terminal device may receive the updated common message. That is, the change notification of the common message and the updated common message may be sent in a same modification period.

S503: The access network device sends the configuration information of the multicast service, where the configuration information of the multicast service is used by the terminal device to receive data of the multicast service.

Accordingly, in S504, the terminal device may obtain the configuration information of the multicast service.

In an example, in S503 and S504, the configuration information of the multicast service may be initial configuration information of the multicast service. In this case, the configuration information of the multicast service may include an identifier of the multicast service and a G-RNTI associated with the multicast service. The identifier of the multicast service may be information that identifies the multicast service. For example, the identifier of the multicast service may include an internet protocol (internet protocol, IP) and/or a port number of the multicast service. The identifier of the multicast service may be sent by an application server to a core network device, and then sent by the core network device to the access network device. The configuration information of the multicast service may further include at least one of the following: a bandwidth part (bandwidth part, BWP) information corresponding to the G-RNTI associated with the multicast service, a PDSCH scrambling sequence of the multicast service, a DRX parameter of the G-RNTI associated with the multicast service, a demodulation reference signal, and a rate matching reference signal. BWP information corresponding to the G-RNTI includes at least one of the following: bandwidth, a frequency position, a subcarrier spacing (subcarrier spacing, SCS), a cyclic prefix (cyclic prefix, CP) length, configuration information related to a control-resource set (control-resource set, CORESET), and configuration information related to a PDSCH. The CORESET information indicates a time frequency resource on which a PDCCH scrambled by using the G-RNTI is located. The PDSCH scrambling sequence of the multicast service is used by the terminal device to descramble a PDSCH of the multicast service by using the PDSCH scrambling sequence. The DRX parameter of the G-RNTI associated with the multicast service is used by the terminal device to perform G-RNTI detection by using the DRX parameter. The demodulation reference signal is used by the terminal device to demodulate, by using the demodulation reference signal, a PDSCH scheduled by using the G-RNTI. The rate matching reference signal is used by the terminal device to exclude, when receiving the PDSCH scheduled by using the G-RNTI, a position corresponding to the demodulation reference signal.

In addition, when the configuration information of the multicast service is the initial configuration information of the multicast service, the access network device may send the configuration information of the multicast service in a plurality of manners. For example, the access network device may send a dedicated message (for example, a first RRC message) to the terminal device, where the first RRC message includes configuration information of a multicast service that the terminal device is interested in. Accordingly, the terminal device may receive the first RRC message, and further obtain the configuration information of the multicast service. For another example, the access network device may send the common message to the terminal device, where the common message carries the configuration information of the multicast service. Accordingly, the terminal device may receive the common message, and further obtain the configuration information of the multicast service. In the embodiment of this application, a manner of obtaining the initial configuration information of the multicast service by the terminal device is not limited.

S505: The access network device sends first indication information to the terminal device.

Accordingly, in S506, the terminal device may receive the first indication information from the access network device, and further determine, based on the first indication information, a manner of obtaining the configuration update information of the multicast service.

Herein, the configuration update information of the multicast service is for updating the configuration information of the multicast service. For example, if partial information in the configuration information of the multicast service is updated, the configuration update information of the multicast service may include updated partial information. For example, the configuration information of the multicast service includes the identifier of the multicast service, the G-RNTI (for example, G-RNTI_1) associated with the multicast service, the BWP information corresponding to the G-RNTI associated with the multicast service, the PDSCH scrambling sequence of the multicast service, and the DRX parameter of the G-RNTI associated with the multicast service. The configuration update information of the multicast service includes the identifier of the multicast service and a G-RNTI (for example, G-RNTI_2) associated with the multicast service, but does not include the BWP information corresponding to the G-RNTI associated with the multicast service, the PDSCH scrambling sequence of the multicast service, or the DRX parameter of the G-RNTI associated with the multicast service. In other words, the G-RNTI associated with the multicast service is updated from G-RNTI_1 to G-RNTI_2, and other configuration information of the multicast service is not updated.

The following describes the first indication information in detail with reference to two possible cases (Case 1 and Case 2).

1. Case 1

In Case 1, the first indication information may indicate the manner of obtaining the configuration update information of the multicast service by the terminal device. The manner indicated by the first indication information may be a first manner or a second manner, where the first manner is obtaining the configuration update information of the multicast service by receiving the common message, and the second manner is obtaining the configuration update information of the multicast service by receiving a dedicated message. It may be understood that, that the first indication information indicates the manner of obtaining the configuration update information of the multicast service by the terminal device may alternatively be described as that the first indication information indicates a manner of updating the configuration information of the multicast service by the terminal device.

It may be understood that the access network device may send the first indication information to the terminal device for a plurality of times based on a specific requirement, to change the manner of obtaining the configuration update information of the multicast service by the terminal device. For example, the access network device first sends first indication information 1 to the terminal device to indicate that the manner of obtaining the configuration update information of the multicast service by the terminal device is the second manner. After a period of time, if the access network device determines that a quantity of terminal devices that obtain the configuration update information by receiving the dedicated message is large, the access network device may send first indication information 2 to the terminal device to indicate that the manner of obtaining the configuration update information of the multicast service by the terminal device is the first manner.

For case 1, the following describes two possible implementations with reference to Implementation 1 and Implementation 2.

(1) Implementation 1: The access network device sends a second RRC message to the terminal device. The second RRC message includes the first indication information. In other words, the first indication information is carried in the second RRC message. For example, if the terminal device obtains, in S504, the configuration information of the multicast service by receiving the first RRC message, the first RRC message and the second RRC message may be a same RRC message. In other words, the configuration information of the multicast service and the first indication information may be carried in a same message. Alternatively, the first RRC message and the second RRC message may be different RRC messages. In other words, the configuration information of the multicast service and the first indication information may be carried in different messages.

In this implementation, there may be a plurality of specific implementations in which the first indication information indicates the manner of obtaining the configuration update information of the multicast service by the terminal device. For example, the first indication information may indicate whether to obtain the configuration update information of the multicast service by receiving the common message. When the first indication information indicates to obtain the configuration update information of the multicast service by receiving the common message, the terminal device may determine that the manner of obtaining the configuration update information of the multicast service is the first manner. When the first indication information indicates not to obtain the configuration update information of the multicast service by receiving the common message, the terminal device may determine that the manner of obtaining the configuration update information of the multicast service is the second manner. For example, the first indication information may include one bit. When a value of the bit is 1, it indicates to obtain the configuration update information of the multicast service by receiving the common message. When a value of the bit is 0, it indicates not to obtain the configuration update information of the multicast service by receiving the common message.

For another example, the first indication information may indicate the first manner or the second manner by using a bitmap (bitmap), where a correspondence between different bits in the bitmap and manners of obtaining the configuration update information of the multicast service by the terminal device may be preset. For example, the first indication information includes two bits, the first bit in the two bits corresponds to the first manner, and the second bit corresponds to the second manner. When a value of a bit is "1", it indicates to obtain the configuration update information of the multicast service in a manner corresponding to the bit. For example, if values of the two bits are "10" (where that is, a value of the first bit in the two bits is "1", and a value of the second bit is "0"), it indicates to obtain the configuration update information of the multicast service by receiving the common message: or if values of the two bits are "01", it indicates to obtain the configuration update information of the multicast service by receiving the dedicated message.

(2) Implementation 2: Before sending the first indication information to the terminal device, the access network device may first send a third RRC message to the terminal device, where the third RRC message is for configuring that manners of obtaining the configuration update information of the multicast service by the terminal device include the first manner and the second manner, and configuring an index of the first manner and an index of the second manner. For example, the index of the first manner is 0, and the index of the second manner is 1. Further, the access network device may send the first indication information to the terminal device, where the first indication information may include an index of the manner of obtaining the configuration update information of the multicast service by the terminal device. For example, when the first indication information includes the index of the first manner, it indicates that the first indication information indicates the terminal device to obtain the configuration update information of the multicast service by receiving the common channel. When the first indication information includes the index of the second manner, it indicates that the first indication information indicates the terminal device to obtain the configuration update information of the multicast service by receiving dedicated signaling.

In this implementation, the first indication information may be carried in a plurality of possible messages, for example, an RRC message, a MAC CE, DCI, or another possible message. This is not specifically limited.

It should be noted that Implementation 1 and Implementation 2 above are described by using an example in which there are two manners (namely, the first manner and the second manner) of obtaining the configuration update information of the multicast service by the terminal device. In another possible embodiment, manners of obtaining the configuration update information of the multicast service by the terminal device may alternatively be classified at a finer granularity. For example, the manners may be classified into three manners, such as a unicast manner, a multicast manner, and a broadcast manner. The unicast manner means that the terminal device obtains the configuration update information of the multicast service by receiving a unicast message. The multicast manner means that the terminal device obtains the configuration update information of the multicast service by receiving a multicast message. The broadcast manner means that the terminal device obtains the configuration update information of the multicast service by receiving a broadcast message (or the common message). In this case, for the specific implementations in which the first indication information indicates the manner of obtaining the configuration update information of the multicast service by the terminal device, adaptively refer to Implementation 1 and Implementation 2 above.

Specifically, in a possible implementation, the first indication information may include a plurality of bits, and then different manners are indicated by different values of the plurality of bits. For example, the first indication information may include two bits. When values of the two bits are "00", the indicated manner is the unicast manner. When values of the two bits are "01", the indicated manner is the multicast manner. When values of the two bits are "10", the indicated manner is the broadcast manner. The foregoing is merely an example. A specific quantity of used bits and manners corresponding to different values may not be limited in this embodiment of this application.

In still another possible implementation, the first indication information may indicate different manners by using a bitmap, where a correspondence between different bits in the bitmap and the manners of obtaining the configuration update information of the multicast service by the terminal device may be preset. For example, the first indication information includes three bits. In the three bits, the first bit corresponds to the unicast manner, the second bit corresponds to the multicast manner, and the third bit corresponds to the broadcast manner. When a value of a bit is "1", it indicates to obtain the configuration update information of the multicast service in a manner corresponding to the bit. For example, if values of the three bits are "100" (where to be specific, a value of the first bit in the three bits is "1", and values of the second bit and the third bit are "0"), it indicates to obtain the configuration update information of the multicast service by receiving the unicast message. If values of the three bits are "010", it indicates to obtain the configuration update information of the multicast service by receiving the multicast message. If values of the three bits are "001", it indicates to obtain the configuration update information of the multicast service by receiving the broadcast message.

2. Case 2

In Case 2, the first indication information may indicate the terminal device to switch the manner of obtaining the configuration update information of the multicast service. For example, the first indication information indicates to switch the manner of obtaining the configuration update information of the multicast service by the terminal device from a first manner to a second manner or from the second manner to the first manner.

For example, before sending the first indication information to the terminal device, the access network device may first send a fourth RRC message to the terminal device, where the fourth RRC message is for configuring that manners of obtaining the configuration update information of the multicast service by the terminal device include the first manner and the second manner, and configuring an initial manner of obtaining the configuration update information of the multicast service by the terminal device. The initial manner may be the first manner or the second manner. Subsequently, the access network device may send the first indication information to the terminal device to switch the manner of obtaining the configuration update information of the multicast service by the terminal device. The first indication information may be information carried in a message. For example, the message is an RRC message, a MAC CE, or DCI. This is not specifically limited. Alternatively, the first indication information may be understood as a message. For example, the first indication information may be DCI in a preset format, and the DCI in the preset format may be preconfigured by the access network device for the terminal device, and specially indicate the terminal device to switch the manner of obtaining the configuration update information of the multicast service.

It may be understood that the access network device may send the first indication information to the terminal device for a plurality of times based on a specific requirement, to switch the manner of obtaining the configuration update information of the multicast service by the terminal device. For example, if a current manner of obtaining the configuration update information of the multicast service by the terminal device is the initial manner (where for example, the initial manner is the first manner), the terminal device may update the manner of obtaining the configuration update information of the multicast service from the first manner to the second manner after receiving the first indication information. Subsequently, if the terminal device receives the first indication information again, the manner of obtaining the configuration update information of the multicast service may be updated from the second manner to the first manner. The rest may be deduced by analogy.

In embodiments of this application, in consideration of a case in which the terminal device may be interested in a plurality of multicast services, Case 1 above is used as an example, and that the first indication information indicates the manner of obtaining the configuration update information of the multicast service by the terminal device may mean that the first indication information indicates manners of obtaining configuration update information of the plurality of multicast services by the terminal device. For example, if the first indication information indicates the first manner, the manners of obtaining the configuration update information of the plurality of multicast services by the terminal device are all the first manner.

In another possible embodiment, when the terminal device is interested in a plurality of multicast services, the first indication information may alternatively indicate a manner of obtaining, by the terminal device, configuration update information of one or more multicast services that the terminal device is interested in. In this case, when sending the first indication information, the access network device may further indicate a multicast service corresponding to the first indication information. For example, a manner in which the access network device indicates the multicast service corresponding to the first indication information may be an explicit manner or an implicit manner.

(1) Explicit Manner

The explicit manner may mean that the access network device may further send an identifier of the multicast service corresponding to the first indication information or other possible information when sending the first indication information to the terminal device. The following describes possible implementations of the explicit manner with reference to Example 1 to Example 3.

Example 1: For each multicast service that the terminal device is interested in, the access network device may send the first indication information to the terminal device. For example, if the multicast services that the terminal device is interested in include a multicast service 1, a multicast service 2, and a multicast service 3, the access network device may separately send the first indication information for the three multicast services. Specifically, the access network device may send, to the terminal device, first indication information 1 and an identifier of the corresponding multicast service 1, first indication information 2 and an identifier of the corresponding multicast service 2, and first indication information 3 and an identifier of the corresponding multicast service 3, as shown in Table 1. Manners indicated by the first indication information 1, the first indication information 2, and the first indication information 3 may be the same or different. A manner indicated by the first indication information 1, the first indication information 2, or the first indication information 3 may be the foregoing first manner or the foregoing second manner, or may be the unicast manner, the multicast manner, or the broadcast manner. This is not specifically limited.

TABLE 1

| Examples of information that may be sent by an access network device to a terminal device | |
|---|---|
| First indication information | Identifier of a corresponding multicast service |
| First indication information 1 | Identifier of a multicast service 1 |
| First indication information 2 | Identifier of a multicast service 2 |
| First indication information 3 | Identifier of a multicast service 3 |

In this way, after receiving the information shown in Table 1 above, the terminal device may obtain configuration update information of the multicast service 1 in a manner indicated by the first indication information 1, obtain configuration update information of the multicast service 2 in a manner indicated by the first indication information 2, and obtain configuration update information of the multicast service 3 in a manner indicated by the first indication information 3.

Example 2: In consideration of a case in which the access network device may indicate to obtain, in a same manner, configuration update information of several multicast services that the terminal device is interested in, when sending the first indication information, the access network device may also send an identifier list of multicast services corresponding to the first indication information to the terminal device, to reduce bit overheads. For example, if the multicast services that the terminal device is interested in include a multicast service 1, a multicast service 2, a multicast service 3, and a multicast service 4, the access network device may send, to the terminal device, first indication information 1 and an identifier list of corresponding multicast services, and first indication information 2 and an identifier list of corresponding multicast services, as shown in Table 2.

TABLE 2

| Examples of information that may be sent by an access network device to a terminal device | |
|---|---|
| First indication information | Identifier list of corresponding multicast services |
| First indication information 1 | Identifier of a multicast service 1 and identifier of a multicast service 2 |
| First indication information 2 | Identifier of a multicast service 3 and identifier of a multicast service 4 |

In this way, after receiving the information shown in Table 2 above, the terminal device may obtain configuration update information of the multicast service 1 and configuration update information of the multicast service 2 in a manner indicated by the first indication information 1, and obtain configuration update information of the multicast service 3 and configuration update information of the multicast service 4 in a manner indicated by the first indication information 2.

Example 3: The multicast service in this embodiment of this application may be a general concept. During specific implementation, multicast services may be further classified at a finer granularity. For example, the multicast services may be classified into a multicast service of a first type and a multicast service of a second type. In this way, when sending the first indication information, the access network device may further send, to the terminal device, a type that is of the multicast service and to which the first indication information is applicable. For example, if the multicast services that the terminal device is interested in include a multicast service 1, a multicast service 2, a multicast service 3, and a multicast service 4, where the multicast service 1 and the multicast service 2 multicast services of the first type, and the multicast service 3 and the multicast service 4 are multicast services of the second type, the access network device may send, to the terminal device, first indication information 1 and a type of a multicast service corresponding to the first indication information 1, and first indication information 2 and a type of a multicast service corresponding to the first indication information 2, as shown in Table 3.

TABLE 3

| Examples of information that may be sent by an access network device to a terminal device | |
|---|---|
| First indication information | Type of corresponding multicast services |
| First indication information 1 | First type |
| First indication information 2 | Second type |

In this way, after receiving the information shown in Table 3 above, the terminal device may obtain configuration update information of the multicast services (namely, the multicast service 1 and the multicast service 2) of the first type in a manner indicated by the first indication information 1, and obtain configuration update information of the multicast services (namely, the multicast service 3 and the multicast service 4) of the second type in a manner indicated by the first indication information 2.

In addition, in embodiment of this application, the multicast service (for example, a service transmitted by using an SC-PTM technology) is used as an example for description. For another possible service (for example, a broadcast service), the access network device may also indicate, by using the first indication information, a manner of obtaining configuration update information of the broadcast service by the terminal device. For example, if the multicast services that the terminal device is interested in include a multicast service 1 and a multicast service 2, and the terminal device further needs to receive a broadcast service 1 and a broadcast service 2, the access network device may send, to the terminal device, first indication information 1 and a service type (for example, the multicast service) corresponding to the first indication information 1, and first indication information 2, and a service type (for example, the broadcast service) corresponding to the first indication information 2, as shown in Table 4.

TABLE 4

| Examples of information that may be sent by an access network device to a terminal device | |
|---|---|
| First indication information | Corresponding service type |
| First indication information 1 | Multicast service |
| First indication information 2 | Broadcast service |

In this way, after receiving the information shown in Table 4 above, the terminal device may obtain configuration update information of the multicast services (namely, the multicast service 1 and the multicast service 2) in a manner indicated by the first indication information 1, and obtain configuration update information of the broadcast services (namely, the broadcast service 1 and the broadcast service 2) in a manner indicated by the first indication information 2.

(2) Implicit Manner

Different from the explicit manner, the implicit manner may mean that the access network device implicitly indicates, when sending the first indication information to the terminal device, the multicast service corresponding to the first indication information, and does not additionally send an identifier of the multicast service corresponding to the first indication information or other possible information.

In a possible implementation, a bitmap may be used to carry first indication information corresponding to different multicast services. A correspondence between different bits in the bitmap and multicast services may be preconfigured by the access network device, or may be a rule observed by both the terminal device and the access network device. For example, refer to FIG. 6b. If the first indication information includes n bits, and the multicast services that the terminal device is interested in include a multicast service 1, a multicast service 2, and a multicast service 3, a bitmap sent by the access network device to the terminal device may include 3n bits. The first to $n^{th}$ bits in the 3n bits correspond to the multicast service 1, and are for carrying first indication information 1 corresponding to the multicast service 1. $(n+1)^{th}$ to $2n^{th}$ bits correspond to the multicast service 2, and are for carrying first indication information 2 corresponding to the multicast service 2. $(2n+1)^{th}$ to $3n^{th}$ bits correspond to the multicast service 3, and are for carrying first indication information 3 corresponding to the multicast service 3. n is an integer greater than or equal to 1. In other words, the access network device sends the first indication information 1, the first indication information 2, and the first indication information 3 to the terminal device, and indicates, in the implicit manner, the multicast services corresponding to the first indication information 1, the first indication information 2, and the first indication information 3.

In addition, if the correspondence between the different bits in the bitmap and the multicast services is the rule observed by both the terminal device and the access network device, arrangement in the rule may be performed according to a rule of identifiers of the multicast services, for example, in ascending or descending sequence of the identifiers. Alternatively, the rule may be based on a sequence of the multicast services that is configured by the access network device by using an RRC message. For example, if a multicast service configuration sequence in the RRC message is the multicast service 2, the multicast service 1, and the multicast service 3, the bitmap sequentially corresponds to the multicast service 2, the multicast service 1, and the multicast service 3 from left to right.

It may be understood that the foregoing describes a possible example of the implicit manner. In the foregoing example, the correspondence between the different bits in the bitmap and the multicast services may alternatively be replaced with a correspondence between the different bits in the bitmap and types (for example, the foregoing first type and the foregoing second type) of the multicast services. This is not specifically limited.

S507: The terminal device obtains the configuration update information of the multicast service based on the first indication information.

Specifically, Case 1 is used as an example. If the first indication information sent by the access network device in S505 indicates the first manner, when the configuration information of the multicast service needs to be updated subsequently, the access network device may send the configuration update information of the multicast service by using the common message. Further, the terminal device may obtain the configuration update information of the multicast service by receiving the common message. If the first indication information sent by the access network device in S505 indicates the second manner, when the configuration information of the multicast service needs to be updated subsequently, the access network device may send the configuration update information of the multicast service by using the dedicated message. Further, the terminal device may obtain the configuration update information of the multicast service by receiving the dedicated message.

In a possible implementation, before obtaining the configuration update information of the multicast service, the terminal device may send a request message to the access network device. The request message requests the configuration update information of the multicast service. In an example, the terminal device may query, based on a preset period, whether the configuration update information of the multicast service is obtained. If the terminal device determines that no configuration update information of the multicast service is obtained in the preset period (for example, a preset period 1), the terminal device may send the request message to the access network device. If the terminal device determines that the configuration update information of the multicast service has been obtained in a preset period 1, the terminal device may no longer send the request message to the access network device. Duration of the preset period may be set based on an actual requirement, and is not specifically limited. For example, the request message may include time range information. In this case, the configuration update information requested by the request message is configuration update information that is updated in a time range indicated by the time range information. For example, in the foregoing example, the time range indicated by the time range information may be the preset period 1.

Accordingly, after receiving the request message, the access network device may send a response message 1 to the terminal device if the access network device determines that the configuration information of the multicast service is updated in the preset period 1, where the response message 1 indicates that the configuration information of the multicast service is updated in the preset period 1. Further, the access network device may send the configuration update information of the multicast service to the terminal device in the manner indicated by the first indication information. If the access network device determines that the configuration information of the multicast service is not updated in the preset period 1, the access network device may send a response message 2 the terminal device, where the response message 2 indicates that the configuration information of the multicast service is not updated in the preset period 1. In some embodiments, the access network device may send a response message of the request message to the terminal device, so that the terminal device can learn, based on the response message, whether the configuration update information of the multicast service needs to be received. This can effectively avoid unnecessary monitoring, and reduce power consumption. Alternatively, after receiving the request message, if the access network device determines that the configuration information of the multicast service is updated in the preset period 1, the access network device may send the configuration update information of the multicast service to the terminal device in the manner indicated by the first indication information, instead of sending a response message 1. If the access network device determines that the configuration information of the multicast service is not updated in the preset period 1, the access network device may make no response.

In addition, the terminal device may send the request message in a plurality of manners. For example, the request message may be an RRC message, or the request message may be a message (for example, a random access request) used in a random access process. When the request message is a random access request message, the request message may include a random access preamble, and the request message may be carried on a random access resource. For example, the access network device may preconfigure, for the terminal device, a random access preamble and/or a random access resource that request/requests the configuration update information of the multicast service, and then the terminal device may send the request message by using the preconfigured random access preamble and/or the preconfigured random access resource.

For example, after S507, the terminal device may update the configuration information (namely, the initial configuration information) of the multicast service based on the configuration update information of the multicast service, where "update" may alternatively be described as "replace", "substitute", or the like. For example, in the foregoing example, after obtaining the configuration update information of the multicast service, the terminal device may replace original G-RNTI_1 with G-RNTI_2 associated with the multicast service.

It should be noted that, in embodiments of this application, in consideration of a case in which there may be a plurality of terminal devices (which may be in connected mode) interested in the multicast service, there may be a plurality of terminal devices that need to obtain the configuration update information of the multicast service. Further, the access network device may separately send the first indication information to the plurality of terminal devices. In this case, different terminal devices may receive the first indication information at different time (for example, some terminal devices are farther away from the access network device, some terminal devices are closer to the access network device, and the terminal device farther away from the access network device receives the first indication information with a longer delay than the terminal device closer to the access network device). Consequently, a terminal device side and an access network device side may have inconsistent understanding of the manner of obtaining the configuration update information of the multicast service. To resolve this problem, in addition to sending the first indication information to the terminal device, the access network device may further send second indication information to the terminal device, where the second indication information indicates effective time of the first indication information. Case 1 is used as an example. The effective time of the first indication information may be understood as time at which the terminal device starts to obtain the configuration update information of the multicast service in the manner indicated by the first indication information. The first indication information and the second indication information may be carried in a same message, or may be carried in different messages. This is not specifically limited. In this way, all of the different terminal devices may start, at the effective time of the first indication information to obtain the configuration update information of the multicast service in the manner indicated by the first indication information, to ensure that the terminal device side and the access network device side have consistent understanding of the manner of obtaining the configuration update information of the multicast service.

In the foregoing manner, the terminal device in connected mode may determine, based on the first indication information tion sent by the access network device, which of the first manner and the second manner is used to obtain the configuration update information of the multicast service, to avoid using both the first manner and the second manner to obtain the configuration update information of the multicast service, so that unnecessary receiving behavior can be effectively avoided, and the power consumption of the terminal device can be reduced.

In addition, in consideration of a case in which requirements of different multicast services may be different, for example, some multicast services may have higher requirements on reliability, and a feedback mechanism needs to be provided for such services accordingly, or enhanced service continuity assurance needs to be provided when a terminal device receiving such services moves; and for some multicast services may have not high requirements on a receiving performance index (for example, reliability), and only a normal multicast receiving service needs to be provided for such services accordingly. Therefore, in Solution 1 above, the access network device may flexibly indicate different update manners of different terminal devices in connected mode. For example, the terminal devices in connected mode include a terminal device 1 and a terminal device 2 (where requirements of a multicast service that the terminal device 1 is interested in and a multicast service that the terminal device 2 is interested in are different). The access network device may indicate that a manner of obtaining the configuration update information of the multicast service by the terminal device 1 is the first manner, and indicate that a manner of obtaining the configuration update information of the multicast service by the terminal device 2 is the second manner. Therefore, an effect of update manner differentiation can be achieved, and flexibility of regulation and control of the access network device can be improved.

Embodiment 2

In Embodiment 2, a possible implementation of the communication method is described based on Solution 2 above.

Figures 6B, 7:
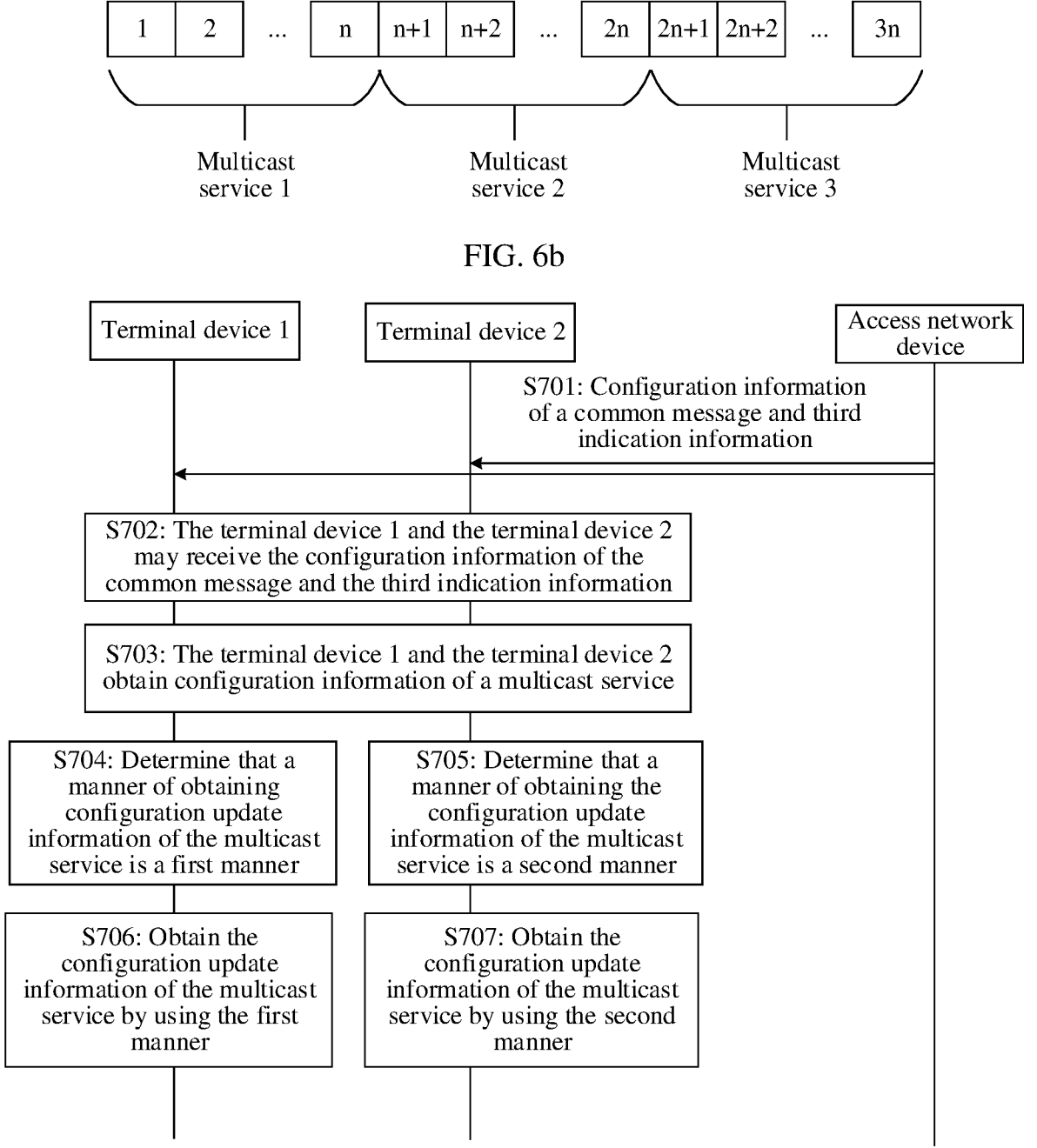
FIG. 6*b* is a schematic diagram of a correspondence between different bits in a bitmap and multicast services according to an embodiment of this application.
FIG. 7 is a schematic flowchart corresponding to a communication method according to Embodiment 2 of this application.

FIG. 7 is a schematic flowchart corresponding to a communication method according to Embodiment 2 of this application. As shown in FIG. 7, the method may include the following steps.

S701: An access network device sends configuration information of a common message and third indication information, where the third indication information indicates that the configuration information of the common message is used by a terminal device in idle mode or inactive mode to receive the common message.

Herein, that the third indication information indicates that the configuration information of the common message is used by a terminal device in idle mode or inactive mode to receive the common message may alternatively be described as that the third indication information indicates that the configuration information of the common message is applicable to the terminal device in idle mode or inactive mode.

In consideration of a case in which content included in the common message may be updated, that the third indication information indicates that the configuration information of the common message is used by a terminal device in idle mode or inactive mode to receive the common message may alternatively be understood as that the third indication information indicates that the configuration information of the common message is used by the terminal device in idle mode or inactive mode to receive the common message that is not updated and an updated common message. For example, the common message that is not updated carries configuration information of a multicast service, and the updated common message carries configuration update information of the multicast service.

For example, the access network device may send the configuration information of the common message and the third indication information in a plurality of manners. For example, the access network device may send the configuration information of the common message and the third indication information by using a system message. That is, the configuration information of the common message and the third indication information may be carried in a same message. In another possible embodiment, the configuration information of the common message and the third indication information may alternatively be carried in different messages. This is not specifically limited. For content included in the configuration information of the common message, refer to the descriptions in Embodiment 1. Details are not described herein again.

Accordingly, in S702, a terminal device 1 and a terminal device 2 may receive the configuration information of the common message and the third indication information. The terminal device 1 may be in idle mode or inactive mode, and the terminal device 2 may be in connected mode.

Herein, after receiving the configuration information of the common message and the third indication information, the terminal device 1 may determine, based on the third indication information, that the common message can be received by using the configuration information of the common message. In addition, after receiving the configuration information of the common message and the third indication information, the terminal device 2 may determine, based on the third indication information, that the common message cannot be received by using the configuration information of the common message, and further may ignore the configuration information of the common message.

S703: The terminal device 1 and the terminal device 2 obtain the configuration information of the multicast service.

Herein, the terminal device 1 may receive the common message based on the configuration information of the common message, where the common message includes the configuration information of the multicast service. The terminal device 2 may receive an RRC message from the access network device, where the RRC message includes the configuration information of the multicast service.

S704: The terminal device 1 determines, based on the RRC mode of the terminal device 1 and the third indication information, that a manner of obtaining the configuration update information of the multicast service is a first manner.

S705: The terminal device 2 determines, based on the RRC mode of the terminal device 2 and the third indication information, that a manner of obtaining the configuration update information of the multicast service is a second manner.

S706: The terminal device 1 obtains the configuration update information of the multicast service by using the first manner.

For example, the terminal device 1 may monitor, based on the configuration information of the common message, a change notification of the common message at a time domain position and a frequency domain position that are indicated by the configuration information. After the change notification of the common message is obtained through monitoring, the terminal device 1 may receive the updated common message. The updated common message includes the configuration update information of the multicast service.

Further, after receiving the configuration update information of the multicast service, the terminal device 1 may update (or replace) the original configuration information by using the configuration update information. For example, the configuration update information includes BWP information (for example, BWP information 2) associated with the multicast service, and the original configuration information includes BWP information (for example, BWP information 1) associated with the multicast service. In this case, the terminal device may update the BWP information associated with the multicast service from the BWP information 1 to the BWP information 2. Subsequently, the terminal device may receive data of the multicast service by using new configuration information (for example, the BWP information 2), instead of receiving the data of the multicast service by using the original configuration information (for example, the BWP information 1).

S707: The terminal device 2 obtains the configuration update information of the multicast service by using the second manner.

For example, the terminal device 2 may receive a unicast message (for example, a message scheduled by using DCI scrambled by using a C-RNTI) from the access network device, where the unicast message includes the configuration update information of the multicast service; and then obtains the configuration update information of the multicast service. Alternatively, the terminal device 2 may receive a multicast message (for example, a message scheduled by using DCI scrambled by using a multicast RNTI) from the access network device, where the multicast message includes the configuration update information of the multicast service; and then obtains the configuration update information of the multicast service. Further, after receiving the configuration update information of the multicast service, the terminal device 2 may update (or replace) the original configuration information by using the configuration update information, and may receive the data of the multicast service by using updated configuration information subsequently.

It should be noted that, in a possible implementation, when the terminal device 2 obtains the configuration update information of the multicast service by using the second manner, whether the terminal device 2 obtains the configuration update information of the multicast service by receiving the unicast message or obtains the configuration update information of the multicast service by receiving the multicast message may depend on the access network device specifically. For example, if the access network device determines that there are a plurality of terminal devices (in connected mode) that need to receive the configuration update information of the multicast service in the second manner, the access network device may send the multicast message to the plurality of terminal devices (including the terminal device 2), where the multicast message includes the configuration update information of the multicast service. Further, the access network device may not send the unicast message to each of the plurality of terminal devices. In this case, the plurality of terminal devices may obtain the configuration update information of the multicast service by receiving the multicast message. For another example, if the access network device determines that a terminal device (in connected mode) that needs to receive the configuration update information of the multicast service in the second manner includes only the terminal device 2, the access network device may send the unicast message to the terminal device 2, where the unicast message includes the configuration update information of the multicast service. In this case, the terminal device 2 may obtain the configuration update information of the multicast service by receiving the unicast message.

In the foregoing manner, the terminal device in connected mode may determine, based on the third indication information sent by the access network device, to obtain the configuration update information of the multicast service by using the second manner, and not to obtain the configuration update information of the multicast service by using the common message, so that unnecessary receiving behavior can be effectively avoided, and power consumption of the terminal device can be reduced.

Embodiment 3

In Embodiment 3, a possible implementation of the communication method is described based on Solution 2 above.

Figure 8:
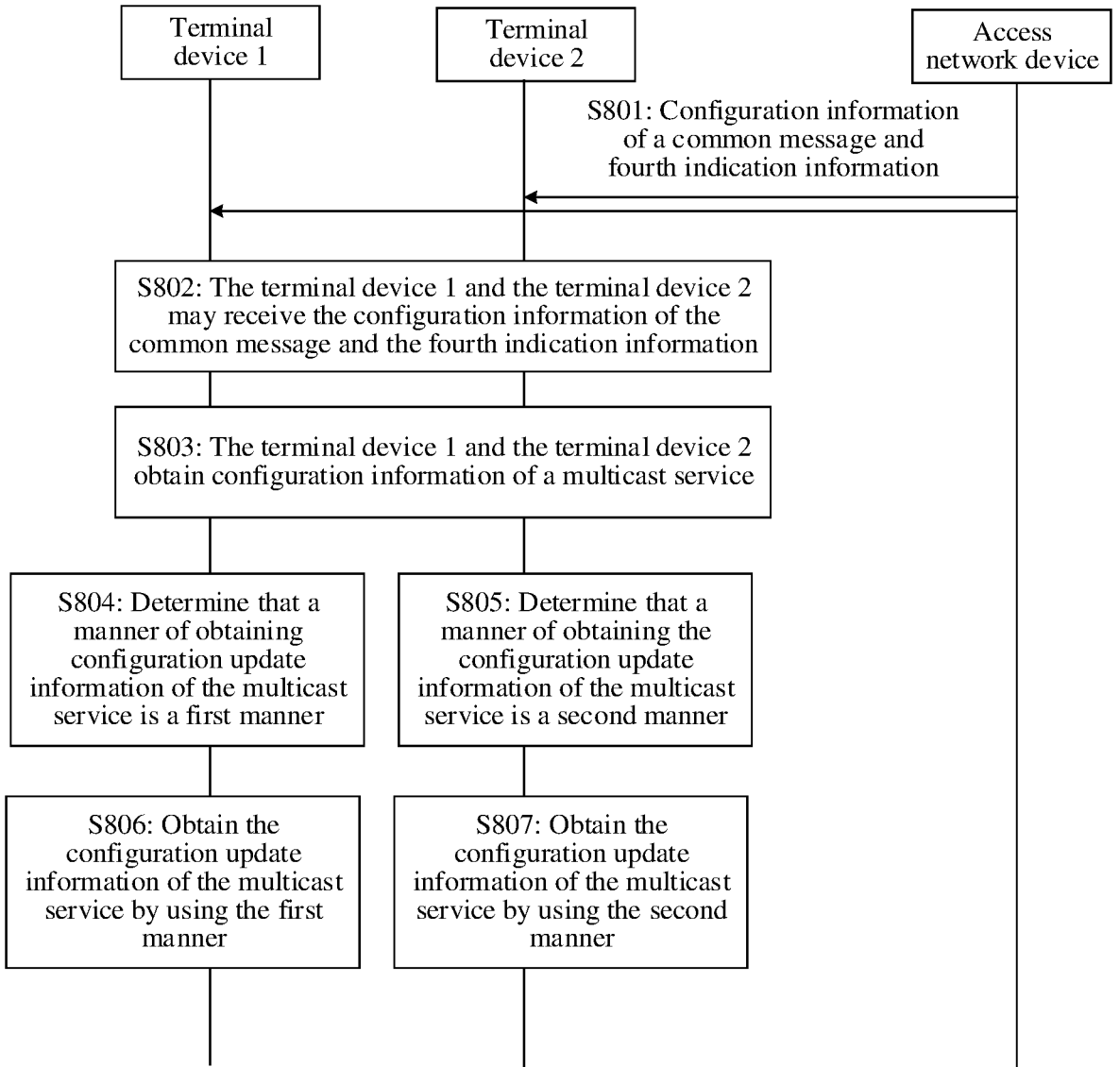
FIG. 8 is a schematic flowchart corresponding to a communication method according to Embodiment 3 of this application.

FIG. 8 is a schematic flowchart corresponding to a communication method according to Embodiment 3 of this application. As shown in FIG. 8, the method may include the following steps.

S801: An access network device sends configuration information of a common message and fourth indication information, where the configuration information of the common message may include change notification information of the common message, and the fourth indication information indicates that the change notification information of the common message is used by a terminal device in idle mode or inactive mode to receive a change notification of the common message. The configuration information of the common message may further include other possible information, such as time domain position configuration information and frequency domain position configuration information of the common message. For details, refer to the descriptions in Embodiment 1. Details are not described herein again.

Herein, that the fourth indication information indicates that the change notification information of the common message is used by a terminal device in idle mode or inactive mode to receive a change notification of the common message may alternatively be described as that the fourth indication information indicates that the change notification information of the common message is applicable to the terminal device in idle mode or inactive mode.

For example, the access network device may send the configuration information of the common message and the fourth indication information in a plurality of manners. For example, the access network device may send the configuration information of the common message and the fourth indication information by using a system message. That is, the configuration information of the common message and the fourth indication information may be carried in a same message. In another possible embodiment, the configuration information of the common message and the fourth indication information may alternatively be carried in different messages. This is not specifically limited.

Accordingly, in S802, a terminal device 1 and a terminal device 2 may receive the configuration information of the common message and the fourth indication information. The terminal device 1 may be in idle mode or inactive mode, and the terminal device 2 may be in connected mode.

Herein, after receiving the configuration information of the common message and the fourth indication information, the terminal device 1 may determine, based on the fourth indication information, that the change notification of the common message can be received by using the change notification information of the common message; and may further receive an updated common message. In addition, after receiving the configuration information of the common message and the fourth indication information, the terminal device 2 may determine, based on the fourth indication information, that the change notification of the common message cannot be received by using the change notification information of the common message, and cannot receive the updated common message; and may further ignore the change notification information of the common message.

It should be noted that, for the common message that is not updated, the terminal device in connected mode, idle mode, or inactive mode may receive, based on the configuration information of the common message, the common message that is not updated

S803: The terminal device 1 and the terminal device 2 obtain configuration information of a multicast service.

Herein, the terminal device 1 may receive the common message based on the configuration information of the common message, where the common message includes the configuration information of the multicast service.

The terminal device 2 may receive the common message (which may be the common message that is not changed herein) based on the configuration information of the common message, where the common message includes the configuration information of the multicast service. Alternatively, the terminal device 2 may receive an RRC message from the access network device, where the RRC message includes the configuration information of the multicast service.

S804: The terminal device 1 determines, based on the RRC mode of the terminal device 1 and the fourth indication information, that a manner of obtaining configuration update information of the multicast service is a first manner.

S805: The terminal device 2 determines, based on the RRC mode of the terminal device 2 and the fourth indication information, that a manner of obtaining the configuration update information of the multicast service is a second manner.

S806: The terminal device 1 obtains the configuration update information of the multicast service by using the first manner.

S807: The terminal device 2 obtains the configuration update information of the multicast service by using the second manner.

For specific implementation of S806 and S807 herein, refer to S706 and S707 above. Details are not described again.

In the foregoing manner, the terminal device in connected mode may determine, based on the fourth indication information sent by the access network device, to obtain the configuration update information of the multicast service by using the second manner, and not to obtain the configuration update information of the multicast service by using the common message, so that unnecessary receiving behavior can be effectively avoided, and power consumption of the terminal device can be reduced.

Embodiment 4

In Embodiment 4, a possible implementation of the communication method is described based on Solution 2 above.

Figure 9:
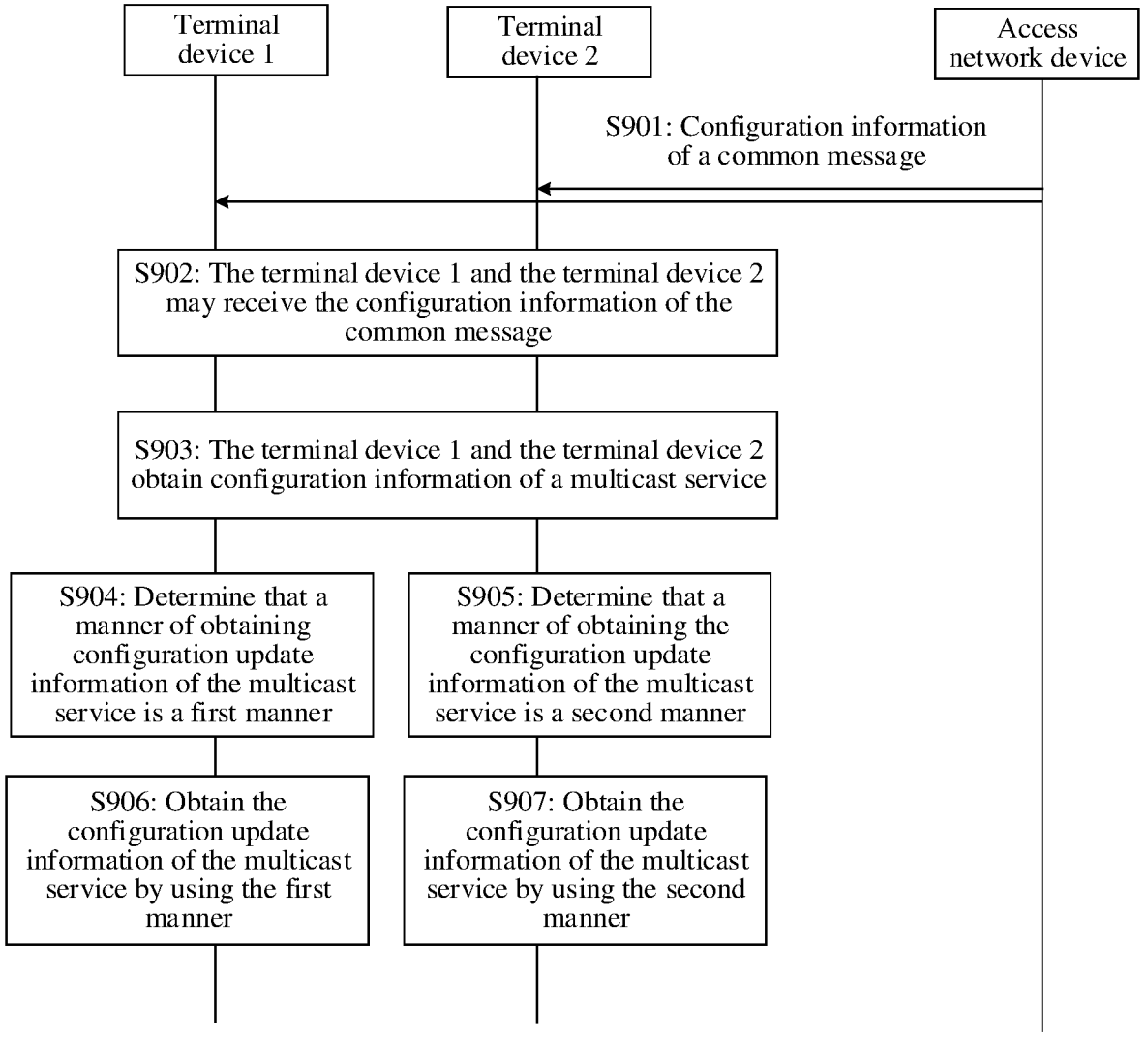
FIG. 9 is a schematic flowchart corresponding to a communication method according to Embodiment 4 of this application.

FIG. 9 is a schematic flowchart corresponding to a communication method according to Embodiment 4 of this application. As shown in FIG. 9, the method may include the following steps.

S901: An access network device sends configuration information of a common message.

Accordingly, in S902, a terminal device 1 and a terminal device 2 may receive the configuration information of the common message. The terminal device 1 may be in idle mode or inactive mode, and the terminal device 2 may be in connected mode.

S903: The terminal device 1 and the terminal device 2 obtain configuration information of a multicast service.

Herein, the terminal device 1 may receive the common message (which may be the common message that is not updated herein) based on the configuration information of the common message, where the common message includes the configuration information of the multicast service.

The terminal device 2 may receive the common message (which may be the common message that is not updated herein) based on the configuration information of the common message, where the common message includes the configuration information of the multicast service. Alternatively, the terminal device 2 may receive an RRC message from the access network device, where the RRC message includes the configuration information of the multicast service.

S904: The terminal device 1 determines, based on the RRC mode of the terminal device 1, that a manner of obtaining configuration update information of the multicast service is a first manner.

Herein, if the terminal device 1 determines that the terminal device 1 is in idle mode or inactive mode, the terminal device 1 may determine that the manner of obtaining the configuration update information of the multicast service is the first manner.

S905: The terminal device 2 determines, based on the RRC mode of the terminal device 2, that a manner of obtaining the configuration update information of the multicast service is a second manner.

Herein, if the terminal device 2 determines that the terminal device 2 is in connected mode, the terminal device 2 may determine that the manner of obtaining the configuration update information of the multicast service is the second manner.

S906: The terminal device 1 obtains the configuration update information of the multicast service by using the first manner.

S907: The terminal device 2 obtains the configuration update information of the multicast service by using the second manner.

For specific implementation of S906 and S907 herein, refer to S706 and S707 above. Details are not described again.

In the foregoing manner, the terminal device in connected mode may determine, based on the current state of the terminal device, to obtain the configuration update information of the multicast service by using the second manner, and not to obtain the configuration update information of the multicast service by using the common message, so that unnecessary receiving behavior can be effectively avoided, and power consumption of the terminal device can be reduced. In addition, In some embodiments, behavior of the terminal device may be effectively standardized based on the state of the terminal device, and there is no need for the access network device to additionally send indication information (where that is, a change to an access network device side is slight), so that signaling overheads can be effectively reduced, and implementation is simple and quick.

For Embodiment 1 to Embodiment 4, it should be noted that:

(1) The foregoing descriptions focus on differences among Embodiment 1 to Embodiment 4. For other content except the differences, mutual reference may be made among Embodiment 1 to Embodiment 4.

(2) Step numbers of the flowcharts described in Embodiment 1 to Embodiment 4 are merely examples of an execution procedure, and do not constitute a limitation on a sequence of performing the steps. In embodiments of this application, there is no strict execution sequence among steps that do not have a time sequence dependency relationship with each other. In addition, not all the steps shown in the flowcharts are mandatory steps, and some steps may be added to or deleted from the flowcharts based on an actual requirement.

The foregoing mainly describes the solutions provided in embodiments of this application from a perspective of interaction between the devices. It may be understood that, to implement the foregoing functions, the access network device or the terminal device may include a corresponding hardware structure and/or software module for implementing each function. A person skilled in the art should be easily aware that, in combination with units and algorithm steps of the examples described in embodiments disclosed in this specification, embodiments of this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional unit division may be performed on the access network device or the terminal device based on the foregoing method examples. For example, each functional unit may be obtained through division based on a corresponding function, or two or more functions may be integrated into one unit. The integrated unit may be implemented in a form of hardware, or may be implemented in a form of a software functional unit.

Figure 10:
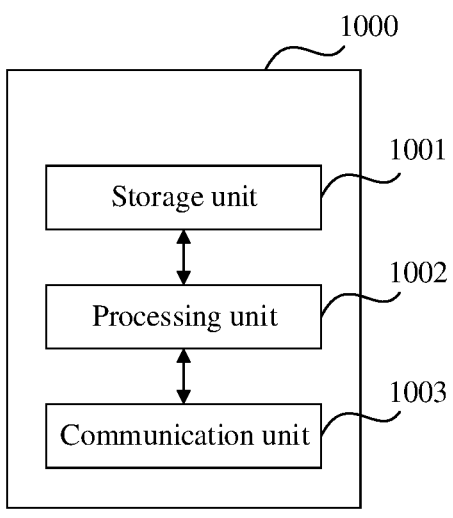
FIG. 10 is a possible example block diagram of an apparatus according to an embodiment of this application.

When the integrated unit is used, FIG. 10 is a possible example block diagram of an apparatus according to an embodiment of this application. As shown in FIG. 10, the apparatus 1000 may include a processing unit 1002 and a communication unit 1003. The processing unit 1002 is configured to control and manage an action of the apparatus 1000. The communication unit 1003 is configured to support communication between the apparatus 1000 and another device. In some embodiments, the communication unit 1003 is also referred to as a transceiver unit, and may include a receiving unit and/or a sending unit, respectively configured to perform a receiving operation and a sending operation. In some embodiments, the apparatus 1000 may further include a storage unit 1001, configured to store program code and/or data of the apparatus 1000.

The apparatus 1000 may be the terminal device in the foregoing embodiments, or may be a chip disposed in the terminal device. The processing unit 1002 may support the apparatus 1000 in performing actions of the terminal device in the foregoing method examples. Alternatively, the processing unit 1002 mainly performs an internal action of the terminal device in the method examples. The communication unit 1003 may support the communication between the apparatus 1000 and the another device.

Specifically, in an embodiment, the communication unit 1003 is configured to: obtain configuration information of a multicast service, where the configuration information is used by the terminal device to receive data of the multicast service; and receive first indication information from an access network device, where the first indication information indicates a manner of obtaining configuration update information of the multicast service by the terminal device, where the manner of obtaining the configuration update information of the multicast service by the terminal device is a first manner or a second manner, where the first manner is obtaining the configuration update information by receiving a common message, and the second manner is obtaining the configuration update information by receiving a dedicated message.

In some embodiments, the communication unit 1003 is specifically configured to: receive a first radio resource control RRC message from the access network device, where the first RRC message includes the configuration information of the multicast service; or receive a common message from the access network device, where the common message includes the configuration information of the multicast service.

In some embodiments, the first indication information is carried in a second RRC message, a MAC CE, or DCI.

In some embodiments, the first indication information includes an index of the manner of obtaining the configuration update information of the multicast service by the terminal device.

In some embodiments, before receiving the first indication information from the access network device, the communication unit 1003 is further configured to receive a third RRC message from the access network device, where the third RRC message includes an index of the first manner and an index of the second manner.

In some embodiments, the communication unit 1003 is further configured to receive second indication information from the access network device, where the second indication information indicates effective time of the first indication information.

In another embodiment, the communication unit 1003 is configured to obtain configuration information of a multicast service, where the configuration information is used by the terminal device to receive data of the multicast service. The processing unit 1002 is configured to determine, based on a radio resource control RRC mode of the terminal device, a manner of obtaining configuration update information of the multicast service by the terminal device, where the manner of obtaining the configuration update information of the multicast service by the terminal device is a first manner or a second manner, where the first manner is obtaining the configuration update information by receiving a common message, and the second manner is obtaining the configuration update information by receiving a dedicated message.

In some embodiments, the processing unit 1002 is specifically configured to: when the terminal device is in idle mode or inactive mode, determine that the manner of obtaining the configuration update information of the multicast service by the terminal device is the first manner; or when the terminal device is in connected mode, determine that the manner of obtaining the configuration update information of the multicast service by the terminal device is the second manner.

In some embodiments, the communication unit 1003 is further configured to receive configuration information of a common message and third indication information from an access network device, where the third indication information indicates that the configuration information of the common message is used by the terminal device in idle mode or inactive mode to receive the common message. The processing unit 1002 is specifically configured to determine, based on the third indication information, that the manner of obtaining the configuration update information of the multicast service by the terminal device is the first manner. The processing unit 1002 is specifically configured to determine, based on the third indication information, that the manner of obtaining the configuration update information of the multicast service by the terminal device is the second manner.

In some embodiments, the communication unit 1003 is further configured to receive configuration information of a common message and fourth indication information from an access network device, where the configuration information of the common message includes change notification information of the common message, and the fourth indication information indicates that the change notification information of the common message is used by the terminal device in idle mode or inactive mode to receive a change notification of the common message. The processing unit 1002 is specifically configured to determine, based on the fourth indication information, that the manner of obtaining the configuration update information of the multicast service by the terminal device is the first manner. The processing unit 1002 is specifically configured to determine, based on the fourth indication information, that the manner of obtaining the configuration update information of the multicast service by the terminal device is the second manner.

The apparatus 1000 may be the access network device in the foregoing embodiments, or may be a chip disposed in the access network device. The processing unit 1002 may support the apparatus 1000 in performing actions of the access network device in the foregoing method examples. Alternatively, the processing unit 1002 mainly performs an internal action of the access network device in the method examples. The communication unit 1003 may support the communication between the apparatus 1000 and the another device.

Specifically, in an embodiment, the communication unit 1003 is configured to: send configuration information of a multicast service, where the configuration information is used by a terminal device to receive data of the multicast service; and send first indication information to the terminal device, where the first indication information indicates a manner of obtaining configuration update information of the multicast service by the terminal device, where the manner of obtaining the configuration update information of the multicast service by the terminal device is a first manner or a second manner, where the first manner is obtaining the configuration update information by receiving a common message, and the second manner is obtaining the configuration update information by receiving a dedicated message.

In some embodiments, the communication unit 1003 is specifically configured to: send a first RRC message to the terminal device, where the first RRC message includes the configuration information of the multicast service: or send a common message, where the common message includes the configuration information of the multicast service.

In some embodiments, the first indication information is carried in a second RRC message, a MAC CE, or DCI.

In some embodiments, the first indication information includes an index of the manner of obtaining the configuration update information of the multicast service by the terminal device.

In some embodiments, before sending the first indication information to the terminal device, the communication unit 1003 is further configured to send a third RRC message to the terminal device, where the third RRC message includes an index of the first manner and an index of the second manner.

In some embodiments, the communication unit 1003 is further configured to send second indication information to the terminal device, where the second indication information indicates effective time of the first indication information.

In another embodiment, the processing unit 1002 is further configured to determine third indication information. The communication unit 1003 is configured to send configuration information of a common message and the third indication information, where the third indication information indicates that the configuration information of the common message is used by a terminal device in idle mode or inactive mode to receive the common message. Alternatively, the processing unit 1002 is configured to determine fourth indication information. The communication unit 1003 is configured to send configuration information of a common message and the fourth indication information, where configuration information of the common message includes change notification information of the common message, and the fourth indication information indicates that the change notification information of the common message is used by a terminal device in idle mode or inactive mode to receive a change notification of the common message.

It should be understood that division into the units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware: or some units may be implemented in a form in which a processing element invokes software, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. In an implementation process, operations in the foregoing methods or the foregoing units may be implemented by using a hardware integrated logic circuit in the processor element, or may be implemented in a form in which the processing element invokes software.

In an example, a unit in any one of the foregoing apparatuses may be one or more integrated circuits configured to implement the foregoing methods, for example, one or more application specific integrated circuits (application specific integrated circuits, ASICs), one or more digital signal processors (digital signal processors, DSPs), one or more field programmable gate arrays (field programmable gate arrays, FPGAs), or a combination of at least two of these forms of integrated circuits. For another example, when the units in the apparatus may be implemented in a form in which a processing element schedules a program, the processing element may be a processor, for example, a general-purpose central processing unit (central processing unit, CPU) or another processor that can invoke the program. For another example, the units may be integrated and implemented in a form of a system-on-a-chip (system-on-a-chip, SoC).

The foregoing unit for receiving is an interface circuit of the apparatus, and is configured to receive a signal from another apparatus. For example, when the apparatus is implemented in a manner of a chip, the receiving unit is an interface circuit used by the chip to receive a signal from another chip or apparatus. The foregoing unit for sending is an interface circuit of the apparatus, and is configured to send a signal to another apparatus. For example, when the apparatus is implemented in the manner of the chip, the sending unit is an interface circuit used by the chip to send a signal to the another chip or apparatus.

Figure 11:
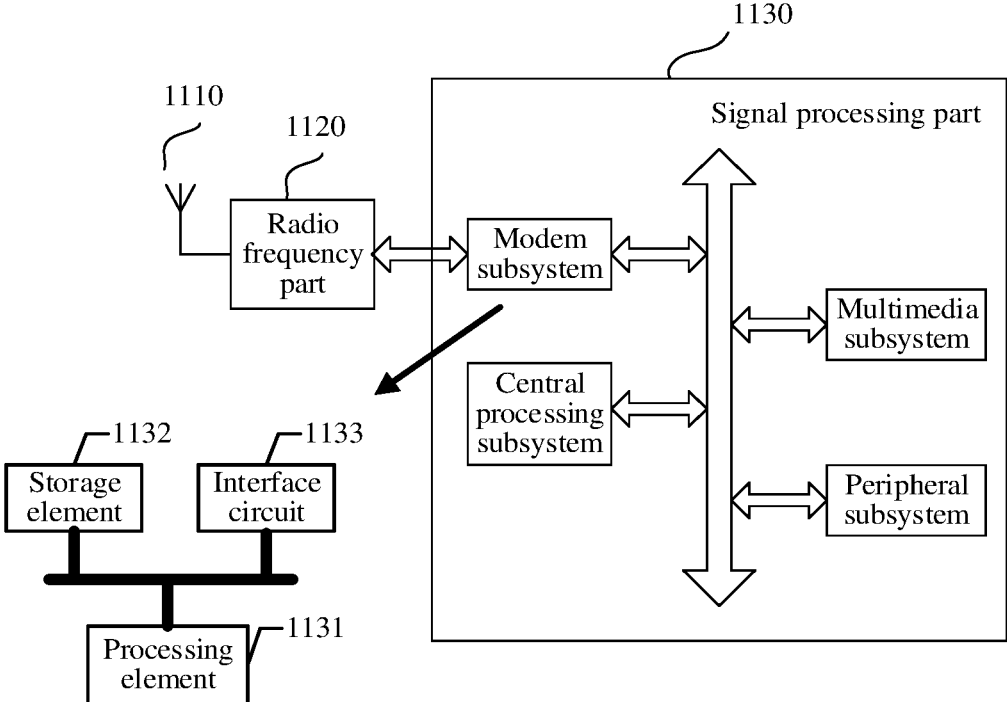
FIG. 11 is a schematic diagram of a structure of a terminal device according to an embodiment of this application.

FIG. 11 is a schematic diagram of a structure of a terminal device according to an embodiment of this application. The terminal device may be the terminal device in the foregoing embodiments, and is configured to implement operations of the terminal device in the foregoing embodiments. As shown in FIG. 11, the terminal device includes an antenna 1110, a radio frequency part 1120, and a signal processing part 1130. The antenna 1110 is connected to the radio frequency part 1120. In a downlink direction, the radio frequency part 1120 receives, through the antenna 1110, information sent by a network device, and sends, to the signal processing part 1130 for processing, the information sent by the network device. In an uplink direction, the signal processing part 1130 processes information about the terminal device, and sends processed information to the radio frequency part 1120. The radio frequency part 1120 processes the information about the terminal device, and then sends processed information to the network device through the antenna 1110.

The signal processing part 1130 may include a modem subsystem that is configured to implement processing on each communication protocol layer of data, may further include a central processing subsystem that is configured to implement processing on an operating system and an application layer of the terminal device, and may further include other subsystems such as a multimedia subsystem and a peripheral subsystem, where the multimedia subsystem is configured to control a camera, screen display, and the like of the terminal device, and the peripheral subsystem is configured to connect to another device. The modem subsystem may be a separately disposed chip.

The modem subsystem may include one or more processing elements 1131, for example, including a main control CPU and other integrated circuits. In addition, the modem subsystem may further include a storage element 1132 and an interface circuit 1133. The storage element 1132 is configured to store data and a program. However, a program for performing the method performed by the terminal device in the foregoing methods may not be stored in the storage element 1132, but is stored in a memory outside the modem subsystem. The program is loaded and used by the modem subsystem when being used. The interface circuit 1133 is configured to communicate with another subsystem.

The modem subsystem may be implemented by using a chip. The chip includes at least one processing element and an interface circuit. The processing element is configured to perform steps in any one of the foregoing methods performed by the terminal device. The interface circuit is configured to communicate with another apparatus. In an implementation, units of the terminal device that implement the steps in the foregoing methods may be implemented by a program scheduled by a processing element. For example, the apparatus used for the terminal device includes a processing element and a storage element. The processing element invokes a program stored in the storage element, to perform the methods performed by the terminal device in the foregoing method embodiments. The storage element may be a storage element located on a same chip as the processing element, that is, an on-chip storage element.

In another implementation, the program for performing the method performed by the terminal device in the foregoing methods may be in a storage element located on a different chip from the processing element, that is, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. The processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

The units of the terminal device that implement the steps in the foregoing methods may be integrated together and implemented in a form of SoC. The SoC is configured to implement the foregoing methods. At least one processing element and a storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by a program invoked by the processing element, and functions of some units may be implemented by the integrated circuit.

It can be learned that the foregoing apparatus used for the terminal device may include at least one processing element and an interface circuit. The at least one processing element is configured to perform any one of the methods that are performed by the terminal device and that are provided in the foregoing method embodiments. The processing element may perform, in a first manner, to be specific, by invoking the program stored in the storage element, some or all steps performed by the terminal device: may perform, in a second manner, to be specific, by using a hardware integrated logical circuit in the processor element in combination with instructions, some or all steps performed by the terminal device: or may certainly perform, by combining the first manner and the second manner, some or all steps performed by the terminal device.

The processing element herein is the same as that described above, and may be implemented by using a processor. A function of the processing element may be the same as that of the processing unit described in FIG. 10. For example, the processing element may be a general-purpose processor, for example, a CPU, or may be one or more integrated circuits configured to implement the foregoing methods, for example, one or more ASICs, one or more microprocessors DSPs, one or more FPGAs, or a combination of at least two of these forms of integrated circuits. The storage element may be implemented by using a memory. A function of the storage element may be the same as that of the storage unit described in FIG. 10. The storage element may be a memory, or may be a general name of a plurality of memories.

The terminal device shown in FIG. 11 can implement processes related to the terminal device in the foregoing method embodiments. Operations and/or functions of modules in the terminal device shown in FIG. 11 are separately for implementing corresponding procedures in the foregoing method embodiments. For details, refer to the descriptions in the foregoing method embodiments. To avoid repetition, detailed descriptions are properly omitted herein.

Figure 12:
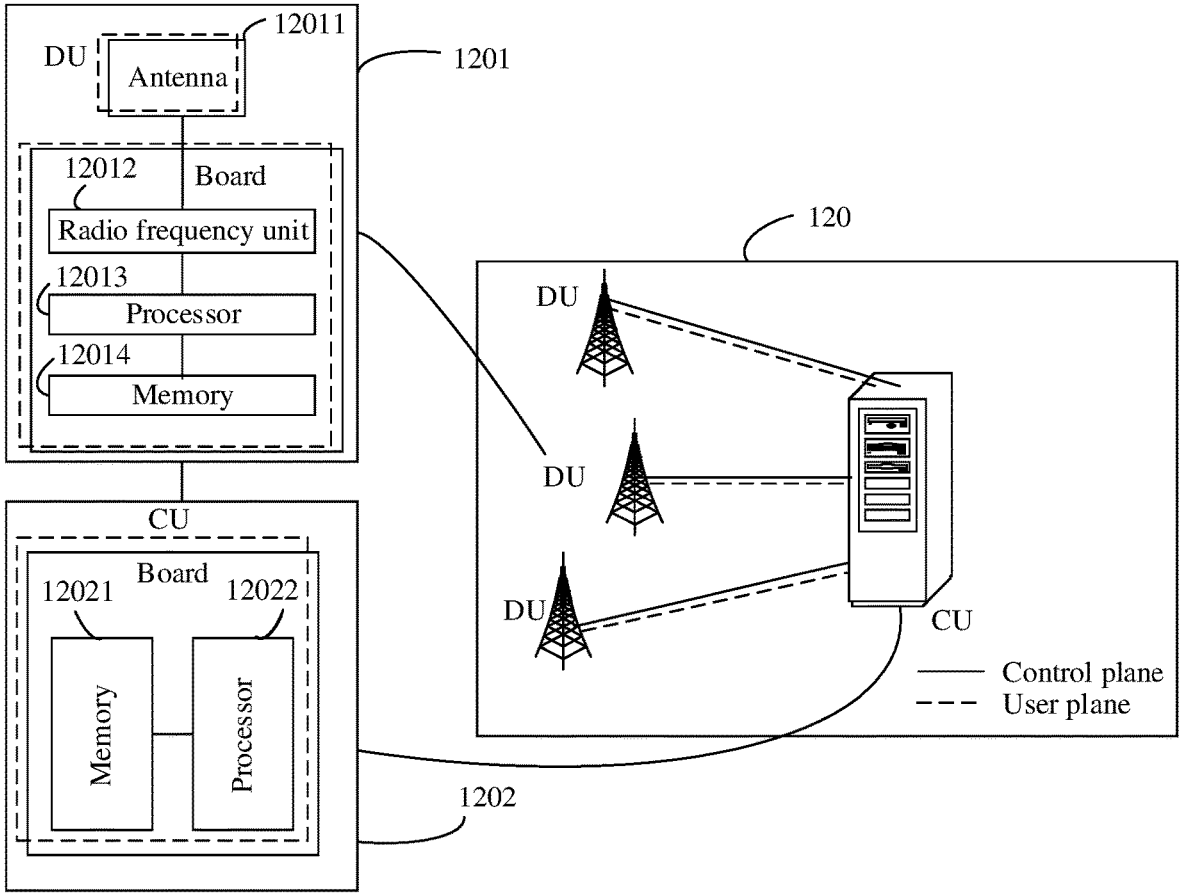
FIG. 12 is a schematic diagram of a structure of an access network device according to an embodiment of this application.

FIG. 12 is a schematic diagram of a structure of an access network device according to an embodiment of this application. The access network device (or a base station) may be applied to the system architecture shown in FIG. 1, and perform functions of the access network device in the foregoing method embodiments. The access network device 120 may include one or more DUs 1201 and one or more CUs 1202. The DU 1201 may include at least one antenna 12011, at least one radio frequency unit 12012, at least one processor 12013, and at least one memory 12014. The DU 1201 is mainly configured to receive and send a radio frequency signal, convert the radio frequency signal and a baseband signal, and perform partial baseband processing. The CU 1202 may include at least one processor 12022 and at least one memory 12021.

The CU 1202 is mainly configured to perform baseband processing, control the access network device, and the like. The DU 1201 and the CU 1202 may be physically disposed together, or may be physically disposed separately, that is, a distributed base station. The CU 1202 is a control center of the access network device, may also be referred to as a processing unit, and is mainly configured to complete a baseband processing function. For example, the CU 1202 may be configured to control the access network device to perform an operation procedure related to the access network device in the foregoing method embodiments.

In addition, in some embodiments, the access network device 120 may include one or more radio frequency units, one or more DUs, and one or more CUs. The DU may include at least one processor 12013 and at least one memory 12014, the radio frequency unit may include at least one antenna 12011 and at least one radio frequency unit 12012, and the CU may include at least one processor 12022 and at least one memory 12021.

In an example, the CU 1202 may include one or more boards. The plurality of boards may jointly support a radio access network (for example, a 5G network) in a single access standard, or may separately support radio access networks in different access standards (for example, an LTE network, a 5G network, or another network). The memory 12021 and the processor 12022 may serve one or more boards. In other words, a memory and a processor may be separately disposed on each board. Alternatively, the plurality of boards may share a same memory and a same processor. In addition, a necessary circuit may be disposed on each board. The DU 1201 may include one or more boards. The plurality of boards may jointly support a radio access network (for example, a 5G network) in a single access standard, or may separately support radio access networks in different access standards (for example, an LTE network, a 5G network, or another network). The memory 12014 and the processor 12013 may serve one or more boards. In other words, a memory and a processor may be separately disposed on each board. Alternatively, the plurality of boards may share a same memory and a same processor. In addition, a necessary circuit may be disposed on each board.

The access network device shown in FIG. 12 can implement processes related to the access network device in the foregoing method embodiments. Operations and/or functions of modules in the access network device shown in FIG. 12 are separately for implementing corresponding procedures in the foregoing method embodiments. For details, refer to the descriptions in the foregoing method embodiments. To avoid repetition, detailed descriptions are properly omitted herein.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to this application. It should be understood that computer program instructions may be used to implement each procedure and/or each block in the flowcharts and/or the block diagrams and a combination of procedures and/or blocks in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus configured to implement a specific function in one or more procedures in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the scope of this application. This application is intended to cover these modifications and variations of this application provided that they fall within the scope of the claims of this application and their equivalent technologies.

What is claimed is:

1. A communication method, comprising:
obtaining, by a terminal device or a chip in the terminal device, configuration information of a multicast service, wherein the configuration information is useable by the terminal device to receive data of the multicast service; and
receiving first indication information from an access network device, wherein the first indication information is useable to indicate a manner of obtaining configuration update information of the multicast service, wherein
the manner of obtaining the configuration update information of the multicast service is a first manner or a second manner, wherein the first manner is obtaining the configuration update information by receiving a common message, and the second manner is obtaining the configuration update information by receiving a dedicated message;
wherein the first indication information is included in a second radio resource control (RRC) message, a media access control (MAC) control element (CE), or downlink control information (DCI); and
the first indication information comprises an index of the manner of obtaining the configuration update information of the multicast service.

2. The method according to claim 1, wherein the obtaining configuration information of the multicast service comprises:
receiving a first radio resource control (RRC) message from the access network device, wherein the first RRC message comprises the configuration information of the multicast service; or
receiving the common message from the access network device, wherein the common message comprises the configuration information of the multicast service.

3. The method according to claim 1, wherein before the receiving the first indication information from the access network device, the method further comprises:
receiving a third RRC message from the access network device, wherein the third RRC message comprises an index of the first manner and an index of the second manner.

4. The method according to claim 1, wherein the method further comprises:
receiving second indication information from the access network device, wherein the second indication information is useable to indicate an effective time of the first indication information.

5. A communication method, comprising:
sending, by an access network device or a chip in the access network device, configuration information of a multicast service, wherein the configuration information is useable by a terminal device to receive data of the multicast service; and
sending first indication information to the terminal device, wherein the first indication information is useable to indicate a manner of obtaining configuration update information of the multicast service by the terminal device, wherein
the manner of obtaining the configuration update information of the multicast service is a first manner or a second manner, wherein the first manner is obtaining the configuration update information by receiving a common message, and the second manner is obtaining the configuration update information by receiving a dedicated message;
wherein the first indication information is carried in a second radio resource control (RRC) message, a media access control (MAC) control element (CE), or downlink control information (DCI); and
the first indication information comprises an index of the manner of obtaining the configuration update information of the multicast service.

6. The method according to claim 5, wherein the sending configuration information of the multicast service comprises:

sending a first radio resource control (RRC) message to the terminal device, wherein the first RRC message comprises the configuration information of the multicast service; or sending the common message, wherein the common message comprises the configuration information of the multicast service.

7. The method according to claim 5, wherein before the sending the first indication information to the terminal device, the method further comprises:

sending a third RRC message to the terminal device, wherein the third RRC message comprises an index of the first manner and an index of the second manner.

8. The method according to claim 5, wherein the method further comprises:

sending second indication information to the terminal device, wherein the second indication information is useable to indicate an effective time of the first indication information.

9. A communication apparatus, wherein the apparatus comprises a terminal device or a chip in the terminal device configured to perform operations comprising:

obtaining configuration information of a multicast service, wherein the configuration information is useable by the terminal device to receive data of the multicast service; and receiving first indication information from an access network device, wherein the first indication information is useable to indicate a manner of obtaining configuration update information of the multicast service by the terminal device, wherein the manner of obtaining the configuration update information of the multicast service is a first manner or a second manner, wherein the first manner is obtaining the configuration update information by receiving a common message, and the second manner is obtaining the configuration update information by receiving a dedicated message;

wherein the first indication information is carried in a second radio resource control (RRC) message, a media access control (MAC) control element (CE), or downlink control information (DCI); and the first indication information comprises an index of the manner of obtaining the configuration update information of the multicast service.

* * * * *